US010782787B2

(12) United States Patent
Smith

(10) Patent No.: US 10,782,787 B2
(45) Date of Patent: Sep. 22, 2020

(54) MIRRORING TOUCH GESTURES

(71) Applicant: Adobe Inc., San Jose, CA (US)

(72) Inventor: Kevin Gary Smith, Lehi, UT (US)

(73) Assignee: ADOBE INC., San Jose, CA (US)

( * ) Notice: Subject to any disclaimer, the term of this patent is extended or adjusted under 35 U.S.C. 154(b) by 497 days.

(21) Appl. No.: 14/297,896

(22) Filed: Jun. 6, 2014

(65) Prior Publication Data
US 2015/0355715 A1 Dec. 10, 2015

(51) Int. Cl.
*G06F 3/00* (2006.01)
*G06F 3/01* (2006.01)
*G06F 3/0488* (2013.01)
*H04N 5/44* (2011.01)
*H04N 21/422* (2011.01)
*H04N 21/414* (2011.01)
*H04L 29/06* (2006.01)
*G06F 1/16* (2006.01)
*H04N 5/445* (2011.01)

(52) U.S. Cl.
CPC ............ *G06F 3/017* (2013.01); *G06F 1/1694* (2013.01); *G06F 3/04883* (2013.01); *H04L 65/00* (2013.01); *H04N 5/4403* (2013.01); *H04N 21/41407* (2013.01); *H04N 21/42201* (2013.01); *H04N 21/42222* (2013.01); *H04N 21/42224* (2013.01); *G06F 2200/1637* (2013.01); *H04N 2005/443* (2013.01); *H04N 2005/4428* (2013.01); *H04N 2005/4432* (2013.01); *H04N 2005/44573* (2013.01)

(58) Field of Classification Search
CPC ...... G06F 3/048; G06F 3/0488; G06F 3/0484; G06F 3/04883
See application file for complete search history.

(56) References Cited

U.S. PATENT DOCUMENTS

| | | | | |
|---|---|---|---|---|
| 5,781,174 A | * | 7/1998 | Uya | G06F 3/0425 345/156 |
| 8,622,742 B2 | * | 1/2014 | Benko | G06F 3/04883 434/118 |
| 8,736,557 B2 | * | 5/2014 | Chaudhri | G06F 3/04815 345/173 |
| 9,218,064 B1 | * | 12/2015 | Li | G06F 3/0488 |
| 2006/0129951 A1 | * | 6/2006 | Vaananen | G06F 1/1626 715/864 |
| 2008/0052643 A1 | * | 2/2008 | Ike | G06F 3/017 715/863 |
| 2008/0163130 A1 | * | 7/2008 | Westerman | G06F 3/04883 715/863 |
| 2009/0135135 A1 | * | 5/2009 | Tsurumi | G06F 3/017 345/156 |
| 2009/0178011 A1 | * | 7/2009 | Ording | G06F 9/453 715/863 |
| 2009/0287790 A1 | * | 11/2009 | Upton | H04L 12/1827 709/208 |

(Continued)

*Primary Examiner* — Kieu D Vu
*Assistant Examiner* — Andrew Chung
(74) *Attorney, Agent, or Firm* — Keller Jolley Preece

(57) ABSTRACT

The present disclosure is directed toward systems and methods that mirror a display on a touch screen as well as touch gestures being performed on the touch screen. For example, systems and methods described herein involve detecting a touch gesture being performed on a touch screen and providing a semi-transparent animation of the touch gesture on a mirrored display. The semi-transparent animation can allow users to view both the mirrored display and the touch gesture animation.

20 Claims, 11 Drawing Sheets

(56) References Cited

U.S. PATENT DOCUMENTS

| | | | |
|---|---|---|---|
| 2011/0074710 A1* | 3/2011 | Weeldreyer | G06F 3/0481 345/173 |
| 2011/0078624 A1* | 3/2011 | Missig | G06F 3/04883 715/802 |
| 2011/0216075 A1* | 9/2011 | Shigeta | G06F 3/048 345/473 |
| 2011/0219340 A1* | 9/2011 | Pathangay | G06F 3/01 715/863 |
| 2012/0004033 A1* | 1/2012 | Lyons | G06F 3/04886 463/35 |
| 2012/0173069 A1* | 7/2012 | Tsimhoni | G01C 21/365 701/25 |
| 2012/0200574 A1* | 8/2012 | Hill | G06F 9/453 345/473 |
| 2012/0235912 A1* | 9/2012 | Laubach | G06F 3/04895 345/163 |
| 2013/0169537 A1* | 7/2013 | Tsurumi | G06F 3/005 345/158 |
| 2013/0171607 A1* | 7/2013 | Markiewicz | G06F 3/017 434/365 |
| 2013/0222229 A1* | 8/2013 | Kanda | G06F 3/1454 345/156 |
| 2014/0028719 A1* | 1/2014 | Hirotani | G06T 11/00 345/634 |
| 2014/0104189 A1* | 4/2014 | Marshall | G06F 3/0488 345/173 |
| 2014/0149859 A1* | 5/2014 | Van Dyken | H04W 4/21 715/702 |
| 2014/0181759 A1* | 6/2014 | Kim | B60K 35/00 715/863 |
| 2014/0189602 A1* | 7/2014 | Wang | G06F 3/1454 715/863 |
| 2014/0282162 A1* | 9/2014 | Fein | G06F 3/0486 715/769 |
| 2014/0304644 A1* | 10/2014 | Pereira | G06F 3/0485 715/784 |
| 2014/0351761 A1* | 11/2014 | Bae | G06F 3/04817 715/835 |
| 2015/0026646 A1* | 1/2015 | Ahn | G06K 9/00201 715/863 |
| 2015/0200985 A1* | 7/2015 | Feldman | H04L 67/36 715/753 |

* cited by examiner

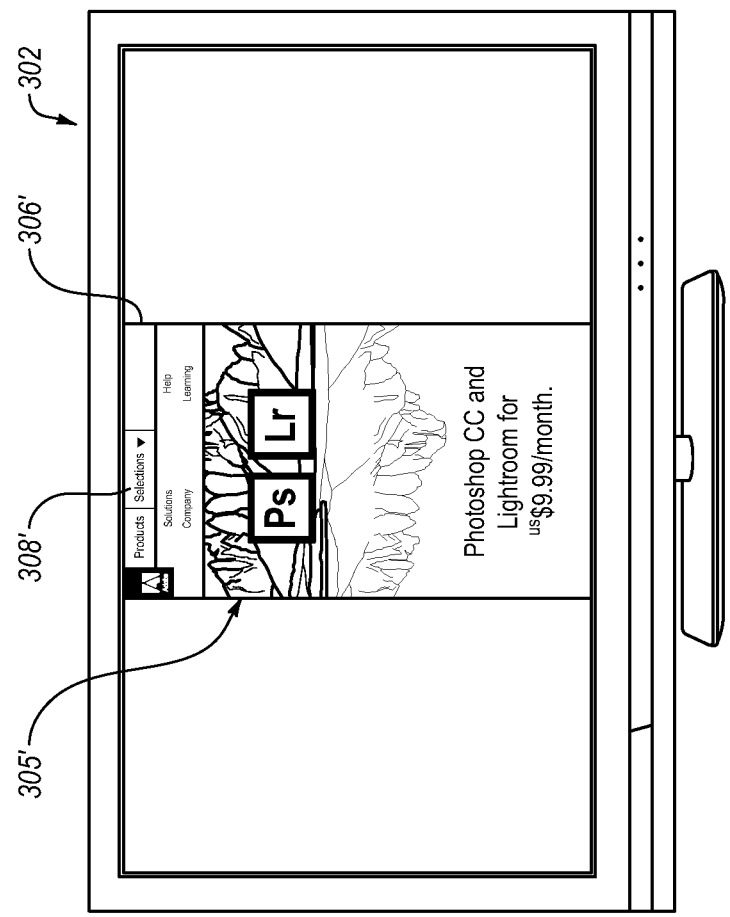
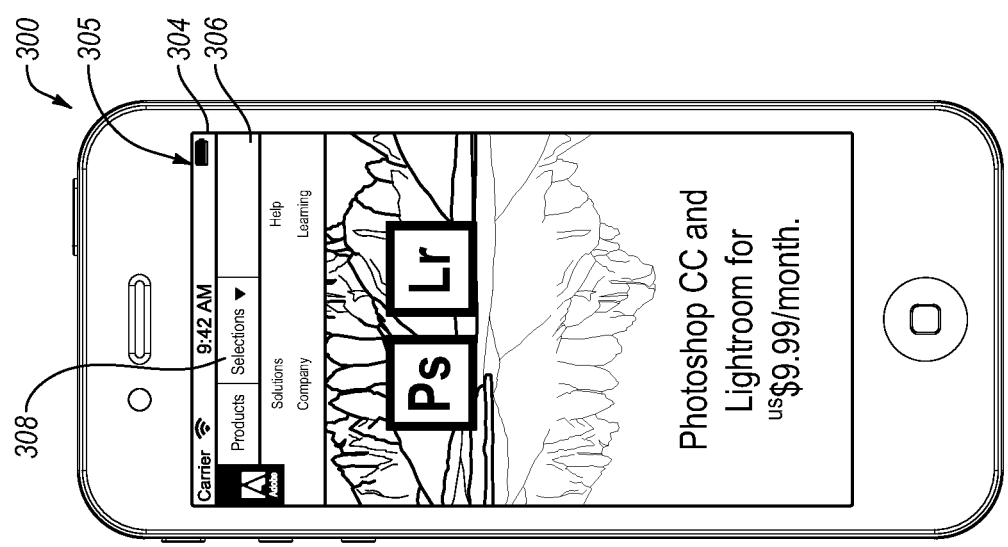
Fig. 3B
Fig. 3A

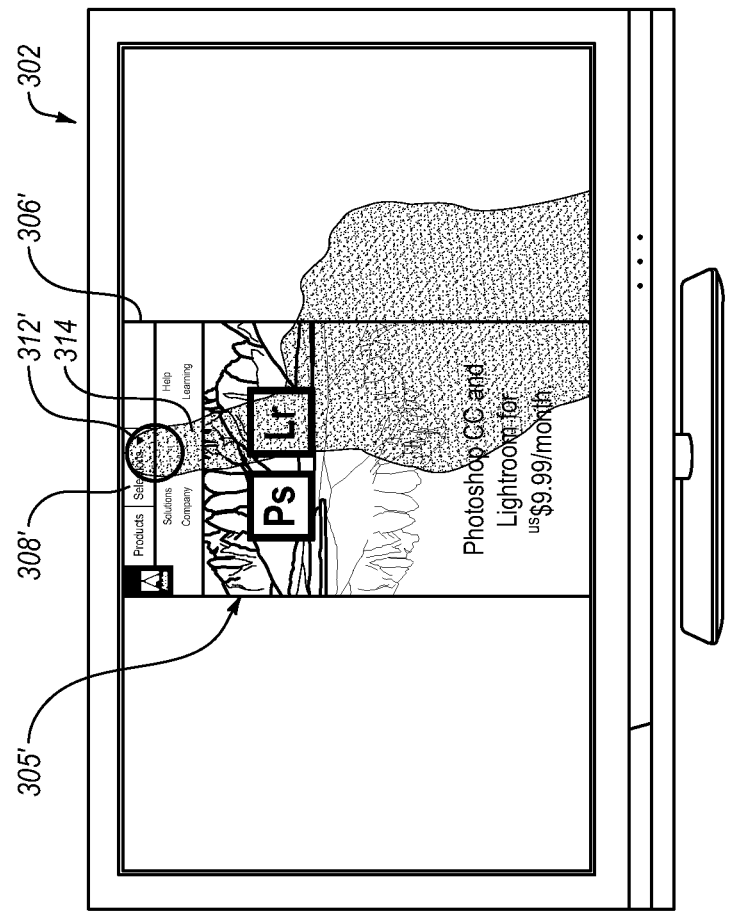
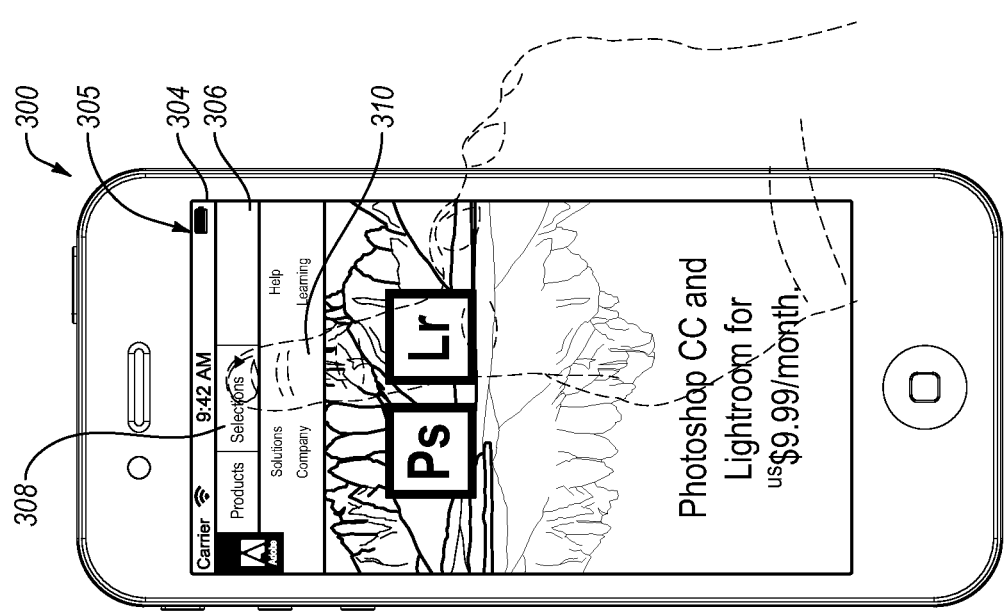
Fig. 3D
Fig. 3C

MIRRORING TOUCH GESTURES

CROSS REFERENCE TO RELATED APPLICATIONS

N/A

BACKGROUND

1. Technical Field

One or more embodiments relate generally to mirroring displays. More specifically, one or more embodiments relate to mirroring user touch gestures that are performed on a touch screen.

2. Background and Relevant Art

Computing devices featuring a touch screen have become commonplace. Touch screen are frequently included as part of a variety of computing devices such as: laptops, tablets, personal digital assistants, media players, mobile phones, and even large format interactive displays. Users commonly interact with touch screens in order to perform a wide range of tasks.

It is common for a user to desire to demonstrate touch gestures for one or more additional users. Users commonly demonstrate touch gestures in order to show features of software. For example, a user may demonstrate touch gestures for an employee training or new software product releases. In some cases, a user may demonstrate touch gestures for only a few people. In other cases, a user may demonstrate touch gestures for a much larger group. For example, a user may demonstrate touch gestures for hundreds of people at an exposition, trade show, or convention.

Touch gesture demonstrations are typically problematic when performed for larger audiences. Touch gestures are difficult to demonstrate for more than a few people at a time because the gestures are typically relatively small (i.e., generally not larger than a human hand). Thus, if an audience member is not within a very short distance of the device upon which the gestures are being performed, the audience member is unlikely to gain any understanding from the demonstration.

It has become common for a demonstrator to employ a video camera in order to demonstrate touch gestures for a group. A document camera, such as an ELMO document camera, is a common type of video camera used for the purpose of demonstrating touch gestures. When a user utilizes a document camera for touch gesture demonstrations, the user typically points the lens of the document camera at a touch screen. The user generally performs a touch gesture on the touch screen, which is then filmed by the document camera. The document camera is typically connected to a projector or television that displays a video of the demonstrator's hand interacting with the touch screen.

The video camera approach to demonstrating touch gestures has several problems. First, document cameras and other types of suitable video cameras are generally large and expensive. Also, using a document camera is typically impractical when the audience includes members who are joining the demonstration via virtual conference software. Additionally, when a demonstrator employs a document camera to demonstrate touch gestures, the demonstrator's hand typically blocks the areas of the touch screen with which the demonstrated touch gestures are interacting. Thus, the audience typically cannot tell which display elements on the touch screen the demonstrator is interacting with via the demonstrated touch gestures.

Mirroring the display of a touch screen does little to solve the problems associated with demonstrating touch gestures for a larger audience. When conventional mirroring software mirrors a display of a touch screen, all that is shown on the mirrored display is updates to the display of the touch screen. Thus, the audience typically has no indication as to any touch gestures that caused the display to update or otherwise change.

Thus, there are several disadvantages to current methods for mirroring displays of touch screens and showing touch gestures.

SUMMARY

One or more embodiments described herein provide benefits and/or solve one or more of the foregoing or other problems in the art with systems and methods that mirror a display on a touch screen as well as touch gestures being performed on the touch screen. For example, one embodiment detects a touch gesture being performed on a touch screen and provides an animation of the touch gesture on a mirrored display. In one or more embodiments, one or more semi-transparent fingers perform the animation of the touch gesture. The semi-transparent fingers can allow users to view both the mirrored display and the touch gesture animation.

As such, one or more embodiments provide a user the ability to easily and effectively demonstrate touch gestures on a mirrored display. In particular, systems and methods described herein can allow a user to mirror a display of a touch screen and accurately demonstrate touch gestures performed on the touch screen. This can allow an audience watching the touch gesture demonstration to effectively observe the interaction of the touch gesture with the touch screen.

In one or more embodiments, the generated demonstration of the touch gesture includes an animation of a figure or object performing the motions of the touch gesture. In a particular embodiment, when the animation is superimposed over the mirrored display, the audience watching the touch gesture demonstration can effectively observe how the touch gesture interacts with the touch screen that is being mirrored. In one or more embodiments, the generated demonstration may be semi-transparent in order for the audience to clearly see the display elements with which the touch gesture is interacting.

Additional features and advantages of the present invention will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof that are illustrated in the appended drawings. It should be noted that the figures are not drawn to scale, and that elements of similar structure or function are generally represented by like reference numerals for illustrative purposes throughout the figures. Understanding that these drawings depict only typical embodiments of the invention and are not therefore to be considered to be limiting of its scope, the invention will be described and explained with additional specificity and detail through the use of the accompanying drawings in which:

FIG. 3A illustrates a display provided on a touch screen in accordance with one or more embodiments;

FIG. 3B illustrates a mirrored display of the display on the touch screen of FIG. 3A provided on a display device in accordance with one or more embodiments;

FIGS. 3C-3D illustrate a touch gesture performed on the touch screen of FIG. 3A and a corresponding demonstration of the touch gesture provided in connection with the mirrored display on the display device of FIG. 3B in accordance with one or more embodiments;

DETAILED DESCRIPTION

One or more embodiments include a display mirroring system that mirrors a display on a touch screen as well as touch gestures being performed on the touch screen. For example, one embodiment detects a touch gesture being performed on a touch screen and provides an animation of the touch gesture overlaid on a mirrored display of the display provided on the touch screen. In one or more embodiments, one or more semi-transparent fingers perform the animation of the touch gesture. The semi-transparent finger(s) allow users to view both the touch gesture animation and the mirrored display beneath the semi-transparent finger(s).

In particular, systems and methods described allow for the mirroring of both a touch screen and touch gestures performed on the touch screen. For example, the display mirroring system described herein detects a touch gesture performed on a touch screen, generates a demonstration of the touch gesture, and superimposes the generated demonstration over a mirrored version of the display on the touch screen. In a particular embodiment, the generated touch gesture demonstration comprises an animation of a semi-transparent object performing the motions of the touch gesture.

As used herein the term "touch gesture" refers to one or more motions or actions performed relative to a touch screen. For example, a touch gesture can comprise one or more fingers touching, sliding along, or otherwise interacting with a touch screen. In alternative embodiments, a touch gesture can comprise another object, such as a stylus, touching or otherwise interacting with a touch screen. Example touch gestures include a tap, a double-tap, a press-and-hold, a scroll, a pan, a flick, a swipe, a multi-finger tap, a multi-finger scroll, a pinch close, a pinch open, and a rotate. Users can perform touch gestures with a single hand or multiple hands. For example, a user may use two or more fingers of both hands to perform a touch gesture. For instance, if a user is playing a game on a tablet computer that includes a simulated remote controller, one thumb may control one part of the simulated remote controller, while the other thumb simultaneously controls another part of the simulated remote controller. Alternative embodiments may include other more complex touch gestures that include multiple fingers of both hands.

Figure 1:
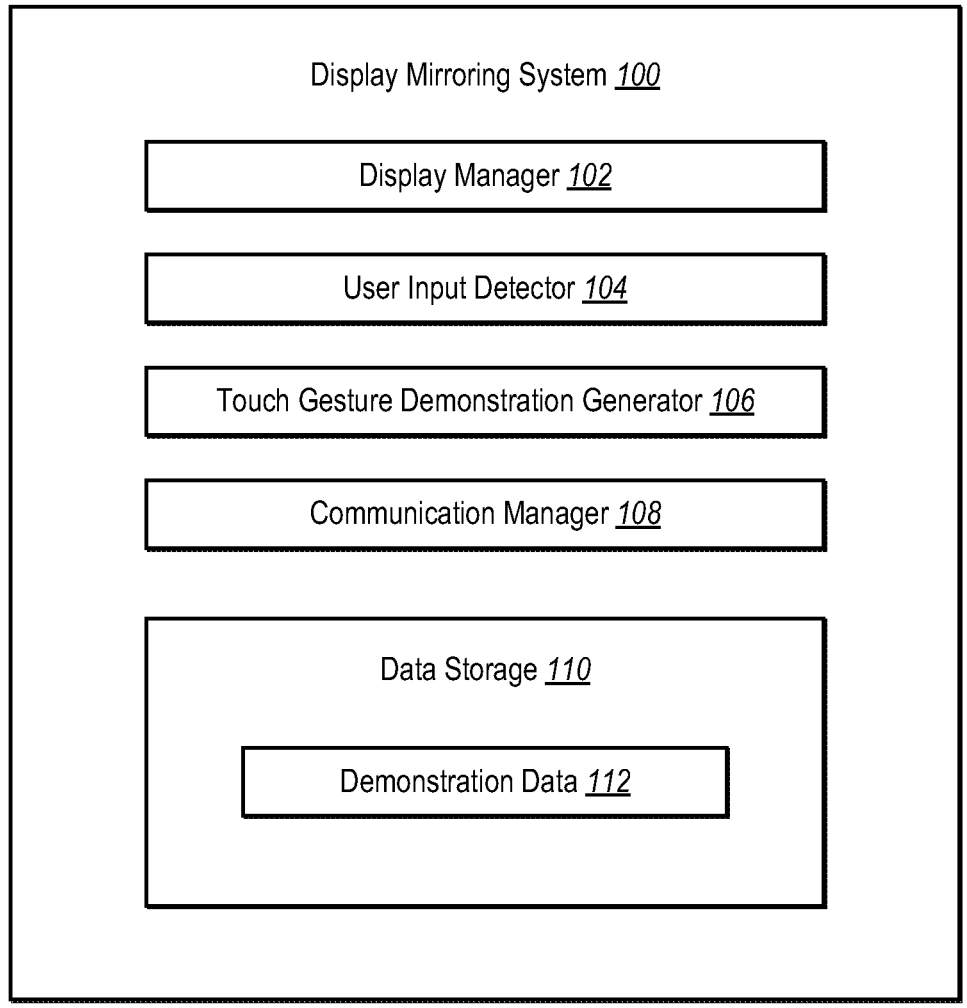
FIG. 1 illustrates a schematic diagram of a display mirroring system in accordance with one or more embodiments.

FIG. 1 illustrates an example embodiment of a display mirroring system 100. As shown, the display mirroring system 100 may include, but is not limited to, a display manager 102, a user input detector 104, a touch gesture demonstration generator 106, a communication manager 108, and a data storage 110. Each of components 102-110 of display mirroring system 100 may be in communication with one another using any suitable communication technologies. One will appreciate in light of the disclosure herein that although components 102-110 are shown to be separate in FIG. 1, any of components 102-110 may be combined into fewer components, such as into a single facility or module, or divided into more components as may serve a particular embodiment. In addition, components 102-110 may be located on, or implemented by, one or more computing devices, such as those described below in relation to FIG. 10. Alternatively, portions of display mirroring system 100 can be located on a client computing-device, while other portions of display mirroring system 100 are located on, or form part of, a server computing-device.

The components 102-110 can comprise software, hardware, firmware, or combinations thereof. For example, the components 102-110 can comprise one or more instructions stored on a computer readable storage medium and executable by processors of one or more computing devices. When executed by the one or more processors, the computer-executable instructions of the display mirroring system 100 can cause a computing device(s) to perform the methods described herein. Alternatively, the components 102-110 can comprise hardware, such as a special purpose processing device to perform a certain function or group of functions.

Additionally or alternatively, the components 102-110 can comprise a combination of computer-executable instructions and hardware.

As mentioned above, and as shown in FIG. 1, the display mirroring system 100 can include a display manager 102. The display manager 102 identifies, provides, manages, and/or controls display provided on a touch screen or other device. Examples of displays include videos, interactive whiteboards, video conference feeds, images, graphical user interfaces (or simply "user interfaces") that allow a user to view and interact with content items, or other items capable of display on a touch screen. For example, the display manager 102 may identify, display, update, or otherwise provide various user interfaces that contain one or more display elements in various layouts. In one or more embodiments, the display manager 102 can identify a display provided on a touch screen. For example, a display provided on a touch screen may include a graphical user interface including one or more display elements capable of being interacted with via one or more touch gestures.

More specifically, the display manager 102 can identify a variety of display elements within a graphical user interface as well as the layout of the graphical user interface. For example, the display manager 102 may identify a graphical user interface provided on a touch screen including one or more display elements. Display elements include, but are not limited to: buttons, text boxes, menus, thumbnails, scroll bars, hyperlinks, etc. In one or more embodiments, the display manager 102 can identify a graphical user interface layout as well as the display elements displayed therein.

The display manager 102 can also provide a mirrored version of an identified display. For example, a mirrored version of a display can include all the display elements of the identified display in the same layout shown in the identified display. The display manager 102 can also superimpose a touch gesture demonstration over a mirrored display, as will be described below. For example, a touch gesture demonstration may be an animation of an object performing the motions of a touch gesture. In one or more embodiments, the display manager 102 can superimpose an animation of the object performing the motions of a touch gesture over a mirrored display, as will be discussed in more detail below.

As mentioned above, and as illustrated in FIG. 1, the display mirroring system 100 may further include a user input detector 104. The user input detector 104 detects, receives, and/or facilitates user input in any suitable manner. In some examples, the user input detector 104 detects one or more user interactions. As referred to herein, a "user interaction" means a single input, or combination of inputs, received from a user by way of one or more input devices, or via one or more touch gestures. A user interaction can have variable duration and may take place relative to a display provided on a touch screen.

For example, the user input detector 104 can detect a touch gesture performed on a touch screen. In particular, the user input detector 104 can detect one or more touch gestures (e.g., tap gestures, swipe gestures, pinch gestures) provided by a user by way of the touch screen. In some examples, the user input detector 104 can detect touch gestures in relation to and/or directed at one or more display elements displayed as part of a display presented on the touch screen.

The user input detector 104 may additionally, or alternatively, receive data representative of a user interaction. For example, the user input detector 104 may receive one or more user configurable parameters from a user, one or more commands from the user, and/or any other suitable user input. In particular, the user input detector 104 can receive voice commands or otherwise sense, detect, or receive user input.

The user interface system 100 may further include a touch gesture demonstration generator 106. The touch gesture demonstration generator 106 can utilize the user input detected by the user input detector 104 in order to generate a demonstration of the detected input. For example, the touch gesture demonstration generator 106 can generate a demonstration of a detected touch gesture. In one or more embodiments, a demonstration of a detected touch gesture may include an animation of the touch gesture. An animation of a touch gesture can comprise an animated figure or other object performing the motions or actions of the detected touch gesture.

In one or more alternative embodiments, the touch gesture demonstration generator 106 can generate a non-animated touch gesture demonstration. For example, a non-animated touch gesture demonstration may be a picture of an object performing a touch gesture. To illustrate, a non-animated demonstration of a pinch open touch gesture may include a picture of a hand with thumb and forefinger pinched together along with arrows outwardly radiating from the thumb and forefinger so as to indicate that the thumb and forefinger are moving away from each other.

The touch gesture demonstration generator 106 may also deliver a generated demonstration to the display manager 102. The display manager 102 can facilitate superimposing of the generated demonstration onto a mirrored display. For example, the touch gesture demonstration generator 106 may deliver a generated demonstration of a touch gesture, which the interface manager 102 may then superimpose onto a mirrored display from a touch screen.

The display mirroring system 100 may further include a communication manager 108. The communication manager 108 can facilitate receiving and sending of data to and from the display mirroring system 100, or a device upon which the display mirroring system 100 is implemented. In particular, the communication manager 108 can facilitate sending and receiving of mirrored displays. For example, the communication manager 108 can instruct or activate one or more display devices to display a provided mirrored display and associated touch gesture demonstrations. Furthermore, the communication manager 108 can package or format displays to be sent or received from the display mirroring system 100 in any form to be sent through one or more communication channels and using an appropriate communication protocol.

As discussed above, the display mirroring system 100 can include a data storage 110, as illustrated in FIG. 1. The data storage 110 may maintain demonstration data 112 representative of data associated with demonstrations generated by the touch gesture demonstration generator 106. For example, the demonstration data 112 can include generated demonstrations, demonstration configuration data, and other similar type data that the display mirroring system 100 may use in connection with providing touch gesture demonstrations.

In one or more embodiments, the demonstration data 112 can comprise template animations of various touch gestures. For example, the demonstration data 112 can include a touch gesture animation template for each possible touch gesture. In such embodiments, the user input detector 104 can detect a touch gesture and its location relative to graphical elements of a display on the touch screen. The touch gesture demonstration generator 106 can then determine which template corresponds to the detected touch gesture. The touch gesture demonstration generator 106 can request or otherwise retrieve the applicable touch gesture animation template from the data storage 110. The touch gesture demonstration generator 106 can then determine how to overlay, place, or otherwise integrate the retrieved touch gesture animation template with a mirrored display.

Figure 2:
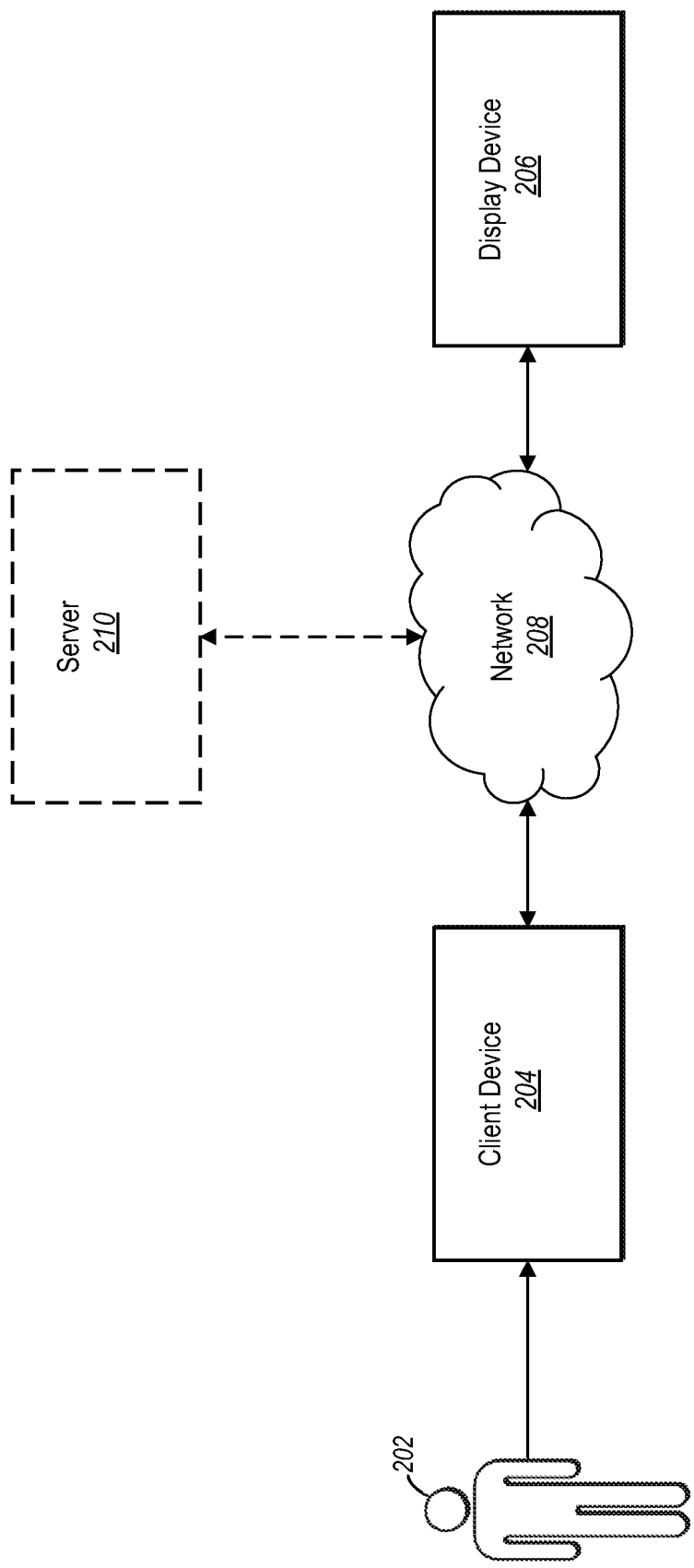
FIG. 2 illustrates a block diagram of an environment for implementing the display mirroring system of FIG. 1 in accordance with one or more embodiments.

FIG. 2 illustrates an exemplary environment in which an implementation of the display mirroring system 100 can operate. In particular, FIG. 2 illustrates a user 202 and an associated client device 204, which may be in communication with a display device 206 via a network 208. The network 208 can comprise any of the networks describe below. In some embodiments, the display mirroring system 100 may be implemented entirely on the client device 204. In alternative embodiments, the display mirroring system 100 may be implemented, at least partially on the client device 204, the display device 206, or a server 210. For example, the client device 204, the display device 206, the server 210, or combinations thereof may perform different components and functionality described above in connection with the display mirroring system 100.

The client device 204 can include any suitable computing device such as those described below in relation to FIG. 10. For example, the client device 204 can comprise a computing device capable of executing one or more client applications, such as a web browser or a native or special-purpose client application, to access and view content over the network 208. In some embodiments, the client device 204 may be a handheld device, such as a mobile device (e.g., a smart phone). As used herein, the term "handheld device" refers to a device sized and configured to be held/operated in a single hand of the user 202. In additional or alternative examples, however, the client device 204 can comprise any other suitable computing device, such as, but not limited to, a laptop or desktop computer, a tablet device, a personal digital assistant device, and/or any other suitable computing device capable of performing one or more of the processes and/or operations described herein.

In any event, the client device 204 can include a touch screen. In some examples, the user 202 may utilize the touch screen to perform one or more touch gestures, interact with graphical user interfaces, and/or provide user input via the client device 204. The touch screen includes at least one surface upon which a user may perform touch gestures.

In some embodiments, the client device 204 may also display a graphical user interface. For example, the touch screen of the client device 204 may include a display of a graphical user interface. In particular, when implemented on the client device 204, the display mirroring system 100 may detect touch gestures performed on a touch screen of client device 204 by user 202.

The display device 206 may present a mirrored version of a display of the touch screen of the client device 204. The display device 206 may be a computing device such as those described below in reference to FIG. 10. For example, the display device 206 can comprise a computer, tablet, a personal digital assistant, a media player, a mobile phone, or other computing device. Alternately or additionally, the display device 206 may also be a simple display device such as a television, a digital projector, a large format display, or the like.

In one or more embodiments, the display mirroring system 100 can reside on the client device 204. In particular, the display mirroring system 100 can provide a mirrored version of a display provided on the touch screen of the client device 204 to the display device 206. The display device 206 can in turn present the mirrored display. For example, the client device 206 can stream data packets representing the mirrored display over the network 208 for presentation on the display device 206. Furthermore, the display mirroring system 100 can detect touch gestures performed on the touch screen of the client device 204. Upon detecting a touch gesture, the display mirroring system 100 can generate a demonstration or animation of the touch gesture. The display mirroring system 100 can then provide instructions to the display device 206 that cause the display device 206 to render the demonstration or animation of the touch gesture over the mirrored display. Alternatively, the display mirroring system 100 can integrate the demonstration or animation of the touch gesture with the data packets representing the mirrored display such that the display device 206 receives the mirrored display and the demonstration or animation of the touch gesture as a single stream.

Thus, the display mirroring system 100 can allow the client device 204 to provide the mirrored display of the client device 204 and associated animated touch gestures to the display device 206. In particular, the display mirroring system 100 can allow the client device 204 to provide the mirrored display of the client device 204 as part a local-network based display mirroring system. For example, the display device 206 can comprise a TV upon which the user 202 can provide a mirrored display of a mobile phone (i.e., the client device 204). Still further, the display device 206 can comprise a projector or other large display device that the user 202 can use to provide a mirrored display of a laptop or tablet computing-device (i.e., the client device 204) as part of a conference presentation.

In some embodiments, the display mirroring system 100 may be implemented on the server 210, which is communicatively coupled with the client device 204 and the display device 206 via the network 208. For example, when implemented on the server 210, the functionalities and capabilities of the display mirroring system 100 operate to identify displays and detect touch gestures of the client device 204, generate touch gesture demonstrations, and provide superimposed touch gesture demonstrations over mirrored versions of display from the client device 204 to the display device 206. In a particular embodiment, the server 210 may provide the functionalities and capabilities of the display mirroring system 100 as part of a virtual conferencing environment.

As used herein, a "virtual conferencing environment" refers to a virtual environment where displays may be mirrored across a network. For example, a virtual conferencing environment can be included as part of software that allows one user to mirror a display including one or more graphical user interfaces from one computing device to another computing device. An example of software that creates a virtual conferencing environment is ADOBE CONNECT. In one or more embodiments, the display mirroring system 100 may be included as part of ADOBE CONNECT or similar software products.

Thus, as shown by FIG. 2, the display mirroring system 100 can provide a mirrored version of a display on a touch screen of the client device 204 overlaid with animated touch gestures to the display device 206 via the network 208. For example, the display mirroring system 100 can provide the mirrored display of the client device 204 and associated animated touch gestures as part of a virtual conferencing session to the display device 206 or multiple display devices (computers, tablets, etc.).

In one or more embodiments, the display mirroring system 100 can receive a video stream of the display on the client device 204. The display mirroring system 100 can then augment the video stream with an animation of a detected touch gesture and send the augmented video stream to the display device 206.

Alternatively, the display mirroring system 100 can capture data associated with the touch gesture (x-y coordinates of the touch gestures, direction of movement, speed of movement, path of movement, end location of the touch gesture, etc.). The display mirroring system 100 can then create an overlay video of the animated touch gesture. The display mirroring system 100 can then provide the overlay video to the display device 206, which can play the overlay video on top of the video of the display on the client device 204.

Additionally or alternatively, the display mirroring system 100 can capture can capture data associated with the touch gesture. The display mirroring system 100 can interpret the data associated with the touch gesture as a particular type of touch gesture with certain characteristics (i.e., swipe gesture starting at position x1, y1, with a speed v, sending at position x2, y2). The display mirroring system 100 can send the interpretation of the touch gesture to a client application (i.e., component of the display mirroring system 100 on the display device 206) that wraps a standard video player. This application or portion of the display mirroring system 100 can then add the overlays to a video of the display from the client device 204 without augmenting the video stream of the display from the client device.

As described above, in one or more embodiments, a client device 204 can implement part or all of the display mirroring system 100. For example FIG. 3A illustrates an example of a client device 204 that may implement one or more components 102-110 of the display mirroring system 100. In particular, the client device 300 illustrated in FIG. 3A is a handheld device, specifically a mobile phone device (e.g., a smartphone).

The client device 300 can include any of the features and components described below in reference to computing device 1000 of FIG. 10. As illustrated in FIG. 3A, the client device 300 includes a touch screen 304 that can display or provide user interfaces, and by way of which user input may be received and/or detected. Additionally or alternatively, the client device 300 may include any other suitable input device, such as a touch pad or those described below in reference to FIG. 10.

FIG. 3A illustrates the touch screen 304 of the client device 300 providing a display 305 including a graphical user interface 306. As shown, graphical user interface 306 may include one or more display elements such as text, pictures, buttons, hyperlinks, multimedia displays, interactive fields or boxes, or any other collection or combination of items suitable for inclusion on a graphical user interface. As shown, the graphical user interface 306 of FIG. 3A includes at least one display element 308. Particularly, in FIG. 3A, the display element 308 is an interactive button. In alternative embodiments, the display element 308 may be any other type of display element as described above.

As previously mentioned, the display mirroring system 100 can provide a mirrored display of the display 305 on the touch screen 304 of the client device 300 to a display device 206. For example, FIG. 3B illustrates an example of a display device 206. The display device 302 shown in FIG. 3B is a television communicatively coupled with the client device 300 of FIG. 3A. In alternative embodiments, the display device 302 can comprise another computing device or other simple display device.

As discussed above, the display mirroring system 100 can provide a mirrored display 305' of the display 305 of the client device 300 to the display device 302. As shown, the mirrored display 305' can include the same display elements in the same configuration as in the display 305. In particular, the mirrored display 305' can include a mirrored graphical user interface 306' of the graphical user interface 306 shown on the touch screen 304 of the client device 300. One will appreciate in light of the disclosure herein that the display mirroring system 100 can capture and stream the display 305 to the display device 302 to create the mirrored display 305'. Thus, the display 305 changes or is updated, the mirrored display 305' can change or update correspondingly.

FIG. 3C illustrates the user 202 performing a touch gesture on the touch screen 304 using a finger 310. The user 202 may use his or her finger 310 to perform a variety of touch gestures on the touch screen 304 so as to interact with the graphical user interface 306 in a variety of ways. It will be understood that while FIG. 3C illustrates the user 202 performing a touch gesture using a finger 310, in alternative embodiments, the user 202 may use an object other than a finger to perform a touch gesture. For example, the user can use a stylus, a thumb, or multiple digits.

In any event, the display mirroring system 100 can detect that the interaction of the finger 310 with the touch screen 304. In particular, the display mirroring system 100 can detect the location(s) relative to the graphical user interface 306 where the finger 310 interacts with the touch screen 304. The display mirroring system 100 can detect movement of the finger 310 and the duration of the interaction of the finger 310 with the touch screen 304. For example, in respect to FIG. 3C, the display mirroring system 100 detect that the user 202 tapped the display element 308. Alternatively, the display mirroring system 100 may not know which display elements 308 are included on the graphical user interface. In such implementations, the display mirroring system 100 can detect data associated with the touch gesture (type of gesture, location relative to the touch screen 304, speed, direction, etc.) without recognizing any relationship to the graphical user interface 306 or display elements 308. As part of detecting the tap, the display mirroring system 100 can detect a duration of the tap.

As discussed above, the display mirroring system 100 can also provide a demonstration of a detected touch gesture. For example, as illustrated in FIG. 3D, the display mirroring system 100 can provide a demonstration of an object (i.e., a representation of a finger 314) performing a tap. In a particular, the display manager 102 the display mirroring system 100 can superimpose the generated demonstration including a representation of a finger 314 over the mirrored graphical user interface 306' displayed on the display device 302.

As a tap touch gesture can be difficult to discern, the demonstration of the tap gesture superimposed over the mirrored display 305' can include one or more aids to help an audience understand that a tap touch gesture has occurred. For example, a tip of the representation of a finger 314 can darken to indicate that the representation of a finger 314 is pressing on the mirrored display element 308'. Alternatively, a touch gesture indicator (i.e., circle) 312' can appear as part of the demonstration or animation of the touch gesture. As illustrated in FIG. 3D, an audience watching a touch gesture demonstration on display device 302 may see the representation of a finger 314 superimposed over mirrored graphical user interface 306'. When the circle 312' appears at the end of representation of a finger 314, the audience may understand that the end of the representation of a finger 314 performed a tap gesture.

It will be understood that while the mirrored touch gesture indicator 312' is illustrated as a circle displayed in connection with the representation of a finger 314 and the mirrored display element 308', a touch gesture demonstration may take alternate forms in alternate embodiments. Namely, in one or more alternative embodiments, the touch gesture demonstration can comprise an animation. For example, an animation of the motions indicated by the mirrored touch gesture indicator 312' may include the representation of a finger 314 hovering momentarily above the mirrored display element 308', the representation of a finger 314 briefly touching the mirrored graphical user interface 306' at the mirrored display element 308', and the representation of a finger 314 lifting off the graphical user interface 306' at the mirrored display element 308'. In a particular embodiment, an audience watching an animated touch gesture demonstration on the display device 302 would see the representation of a finger 314 superimposed over the mirrored graphical user interface 306' and animated to perform the motions described above.

In one embodiment the display mirroring system 100 can superimpose the animated touch gesture such that the animated touch gesture interacts with mirrored display elements (308') corresponding to actual display elements (308) with which the actual touch gesture interacted. Alternatively, the display mirroring system 100 can superimpose the animated touch gesture over a portion of the screen of the display device 302 based on detected data or characteristics of the detected touch gesture. For example, the display mirroring system 100 can detect a position of the touch gesture relative to the dimension of the touch screen 304, the display mirroring system 100 can then provide the animated touch gesture on the display device 302 by translating the detected relative position of the touch gesture to the dimensions of the screen of the display device 302.

In one or more embodiments, the touch gesture demonstration generator 106 may generate the finger 314 such that it is semi-transparent. For example, in FIG. 3D, the representation of a finger 314 is illustrated in shadow. As shown, providing a semi-transparent object to perform the touch gesture allows an audience member watching a touch gesture demonstration to see the display elements over which the touch gesture is being performed. As used herein, the term "semi-transparent" means translucent or partially transparent so that a mirrored display 305' is visible underneath a semi-transparent object. In one or more alternative embodiments, the touch gesture demonstration generator 106 may generate the finger 314 at different levels of opacity.

Furthermore, the display mirroring system 100 can allow a user to customize a touch gesture demonstration. For example, a user can select one or more user-defined demonstration options. As used herein, "demonstration options" refers to a set of one or more configurations that a user can select to modify or tailor a touch gesture demonstration. For example, a user may select or provide demonstration configurations regarding an opacity level of the representation of a finger 314. Specifically, a user may configure the touch gesture demonstration generator 106 to generate a finger 314 that is almost completely transparent. Alternately, a user may configure the touch gesture demonstration generator 106 to generate a finger that is almost completely opaque.

Additionally, a user can configure the object performing the touch gesture demonstration. For example, in FIG. 3D, a finger 314 performs the touch gesture. In other embodiments, a user 202 can select a demonstration configuration to cause an object in another form, such as a stylus, to perform the touch gesture demonstration. Alternatively, a user can select objects having a wide range of colors, patterns, or shapes. For example, a user can select an object in the shape of a magic wand or a dog paw.

In yet another alternative embodiment, a user can select the object to be based on a digital photograph submitted by a user. For example, in one or more embodiments, the touch gesture demonstration generator 106 may generate the finger 314 to look like a digital photograph of a user's hand. In an alternative embodiment, the touch gesture demonstration generator 106 may generate the finger 314 to take the form of a drawing submitted by a user.

Demonstration configurations may also include configurations regarding animations generated by the touch gesture demonstration generator 106. For example, a user may configure the touch gesture demonstration generator 106 to generate an animation of a touch gesture such that the animation includes sound effects. Other demonstration configurations regarding generated animations may include configurations related to the speed of the animation (i.e., how fast representation of a finger 314 moves over mirrored graphical user interface 306'). Still further embodiments include allowing the user to select the way the motions of each demonstrated touch gesture are shown (i.e., representation of a finger 314 may be shown with a slightly bent finger in the middle of a single tap touch gesture.

A user may select demonstration configurations for the touch gesture demonstration generator 106 via one of a variety of acceptable input methods. For example, a user may select demonstration configurations from a graphical user interface populated with multiple demonstration configuration options. Alternatively, a user may provide demonstration configurations through a development suite designed for the purpose of configuring touch gesture demonstrations.

Alternatively, the display mirroring system 100 can generate the demonstration based on the detected touch gesture. For example, the display mirroring system 100 can select the object to perform the demonstration of the touch gesture based on the client device 300. In particular, if the client device 300 includes a stylus, the display mirroring system 100 can use a representation of semi-transparent stylus to perform the demonstration of the touch gesture. In still further embodiments, the display mirroring system 100 can detect a size of the tap and select the object for performing the touch gestured based on the surface area of the touch screen pressed by the tap. For example, if the surface area of the tap is small, the display mirroring system 100 can use a representation of a stylus. If the surface area of the tap is medium sized, the display mirroring system 100 can use a representation of a finger 314. If the surface area of the tap is large, the display mirroring system 100 can use a representation of a thumb.

In one or more embodiments, any update to the graphical user interface 306 of FIG. 3C causes an update to the mirrored graphical user interface 306' of FIG. 3D. For example, if the touch gesture performed by the finger 310 causes the graphical user interface 306 to display a new set of display elements in a new configuration, the display manager 102 can identify the change to the graphical user interface 306. The display manager 102 may also provide a mirrored version of the change to the graphical user interface 306 to the display device 302 of FIG. 3D. In this way, the mirrored graphical user interface 306' of FIG. 3D can always display an updated mirrored version of the graphical user interface 306 of the touch screen 304 of the client device 300.

Changes to the graphical user interface 306 of FIG. 3C may be caused in a variety of ways. For example, as described above, a detected touch gesture may cause a change to the graphical user interface 306. Alternately, a change to the graphical user interface 306 may be caused by another type of user input (e.g., via a keyboard input, via a mouse click, etc.), by a system time-out (e.g., no response given in a predetermined amount of time), or by some other type of predetermined event. Regardless of the cause of a change to the graphical user interface 306 of FIG. 3C, the display mirroring system 100 can provide a mirrored graphical user interface 306' to the display device 302 such that the mirrored graphical user interface 306' of FIG. 3D displays changes or updates to the graphical user interface 306 of FIG. 3C.

In one or more embodiments, the animation of the touch gestures can have a small delay to account for processing. Thus, in one or more embodiments, the animated touch gesture may be slightly out of sync with any updating of the mirrored graphical user interface 306'. Alternatively, the display mirroring system 100 can cause a delay in the video of the mirrored graphical user interface 306' to allow the animated touch gesture to sync with any updating of the mirrored graphical user interface 306'.

FIGS. 3C and 3D illustrate a demonstration of a one-finger single-point touch gesture (i.e., a single tap touch gesture) performed on the client device 300 and displayed on the display device 302. In alternative embodiments, the display mirroring system 100 can detect and provide demonstrations of other types of touch gestures. For example, FIGS. 4A-6B illustrate additional touch gesture demonstrations for other types of touch gestures performed on the client device 300 and displayed on the display device 302. It will be understood that the functions and capabilities of the display mirroring system 100 with regard to FIGS. 3A and 3B are also applicable to FIGS. 4A-6B.

Figure 4B:
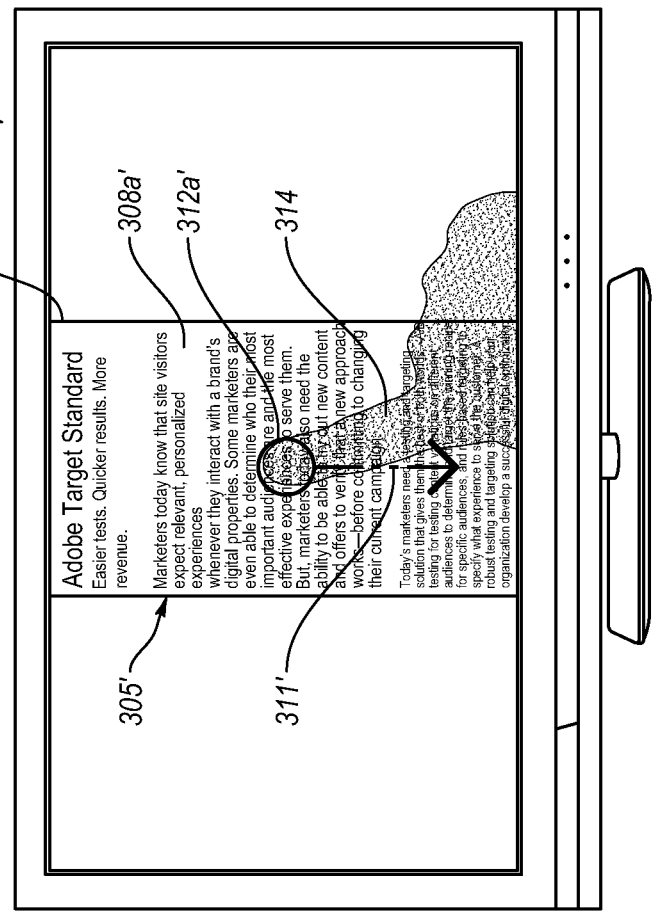
FIGS. 4A-4B illustrate another touch gesture performed on the touch screen of FIG. 3A and a corresponding demonstration of the touch gesture provided in connection with the mirrored display on the display device of FIG. 3B in accordance with one or more embodiments.
Figure 4A:
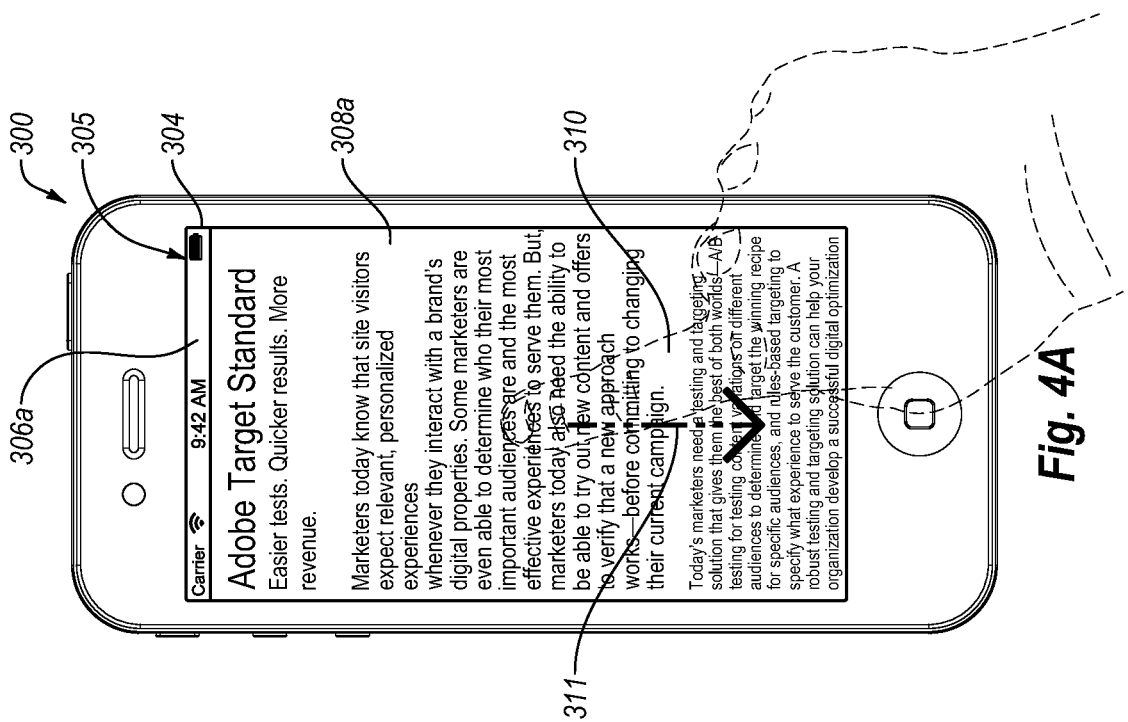

FIGS. 4A and 4B illustrate a touch gesture demonstration for a one-finger multi-point touch gesture. For example, while a one-finger single-point touch gesture includes one finger interacting with one point on a graphical user interface, a one-finger multi-point touch gesture includes one finger interacting with multiple points on a graphical user interface. In one or more embodiments, a one-finger multi-point touch gesture can include a scroll gesture, a flick gesture, pan gesture, or another similar type of gesture.

As discussed above with regard to FIG. 3A, the touch screen 304 may display a graphical user interface of any one of a variety of programs. For example, in FIG. 4A, the graphical user interface 306a is a graphical user interface of an e-reader. Accordingly, the bulk of the graphical user interface 306a is taken up by a single display element 308a, which, in this case, is a text box. In one or more embodiments, a text box display element includes a display of text presented in a scrollable format. In use, a user may read all the text displayed within the display element 308a, and then scroll down to the next unread portion of text using a scroll touch gesture.

As described above, the display mirroring system 100 may detect and utilize touch gestures performed on a touch screen of a client device. For example, in FIG. 4A, the user 202 uses a finger 310 to hover momentarily above an area of display element 308a, press the touch screen 304, and vertically scroll down the touch screen 304 (as indicated by the arrow 311) while remaining in contact with the touch screen 304, and lifting off the touch screen 304. The scroll gesture may include the finger 310 moving vertically up or down. Alternatively, the scroll gesture may include the finger 310 moving horizontally, side-to-side.

Also as described above with regard to FIGS. 3C and 3D, the display mirroring system 100 may provide a demonstration of a detected touch gesture to a display device. For example, the display mirroring system 100 may generate a demonstration of the detected touch gesture according to any of the functions and configurations described above with regard to FIGS. 3C and 3D. In one or more embodiments, the display mirroring system 100 may provide a generated demonstration of a scroll gesture to the display device 302, as shown in FIG. 4B.

As shown by FIG. 4B, a particular embodiment includes the display device 302 displaying the mirrored graphical user interface 306a', which mirrors the graphical user interface 306a of FIG. 4A. As shown, the mirrored graphical user interface 306a' further includes a mirrored display element 308a'. As described above with regard to FIG. 3D, the display mirroring system 100 may superimpose a generated demonstration over the mirrored graphical user interface 306a'. For example, the display manager 102 may superimpose a representation of a finger 314 over the mirrored graphical user interface 306a' so as to provide a demonstration of the scroll gesture detected with regard to FIG. 4A.

As described above, a touch gesture demonstration may include the representation of a finger 314 and a touch gesture indicator 312a', as shown in FIG. 4B. The touch gesture indicator 312a' can indicate when the finger 314 is pressing against the mirrored display 305'. Alternately, the touch gesture demonstration generator 106 may generate an animated touch gesture demonstration including representation of a finger 314 animated to perform the motions of a scroll gesture including representation of a finger 314 hovering momentarily above any area of display element 308a', the finger 314 touching display element 308a', the finger 314 moving vertically while remaining in contact with the display element 308a' as indicated by the arrow 311', and the finger 314 lifting off display element 308a'. In one or more embodiments, an animated touch gesture demonstration may be configured according to any of the configurations discussed above.

The display mirroring system 100 may update the mirrored graphical user interface 306a' so as to match an animated touch gesture demonstration. For example, when the finger 310 performs a scroll gesture on touch screen 304, as shown in FIG. 4A, the display manager 102 can update the graphical user interface 306a to show different text in the display element 308a. In one or more embodiments, when the display manager 102 is superimposing an animated touch gesture demonstration of the scroll gesture of FIG. 4A over the mirrored graphical user interface 306a', the display manager 102 may match any updates to the mirrored graphical user interface 306a' to the touch gesture motions of the animated touch gesture demonstration. For instance, when superimposing a scroll gesture demonstration over the mirrored graphical user interface 306a', as shown in FIG. 4B, the display manager 102 may match an update to the mirrored graphical user interface 306a' to the motion of the animated touch gesture such that the mirrored graphical user interface 306a' shows the text in the mirrored display element 308a' moving up and down as the finger 314 moves up and down in the animated touch gesture demonstration. In this way, an audience watching the animated touch gesture demonstration has a true sense of how the demonstrated touch gesture effects the displayed graphical user interface.

In an alternative embodiment, the touch gesture demonstration of FIG. 4B may not be animated. For example, the display manager 102 may update the mirrored graphical user interface 306a' following the display of representation of a finger 314 in connection with the mirrored touch gesture indicator 312a'. In this way, an audience watching the touch gesture demonstration still has a good idea of how the demonstrated touch gesture effects the displayed graphical user interface.

FIGS. 3C-4B illustrate touch gesture demonstrations for single-finger touch gestures. The display mirroring system 100 may also generate demonstrations of multi-finger touch gestures. For example, a multi-finger touch gesture may include gestures such as a multi-finger tap, a multi-finger swipe, a multi-finger scroll, a pinch open, a pinch close, rotate, or other similar gestures. In one or more embodiments, a multi-finger touch gesture may be a single point gesture, such as a tap, or a multi-point touch gesture, such as a pinch.

Figure 5A:
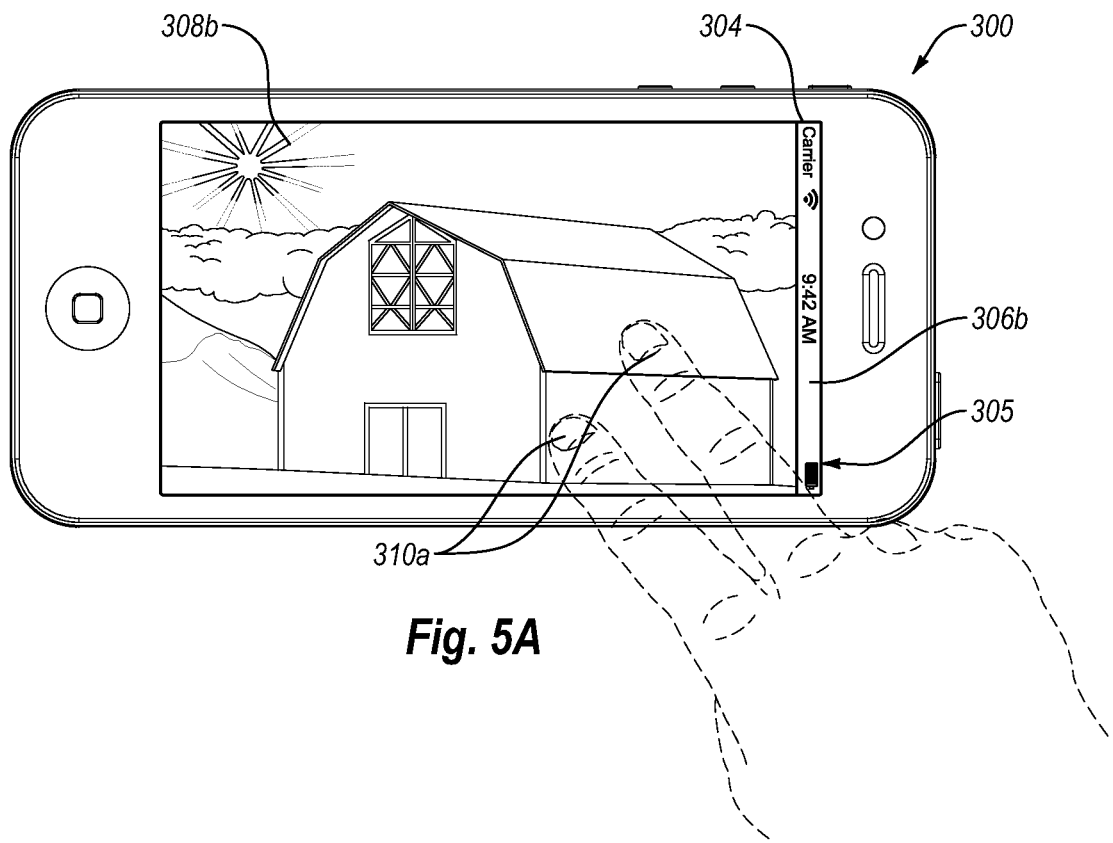
FIGS. 5A-5B illustrate yet touch gesture performed on the touch screen of FIG. 3A and a corresponding demonstration of the touch gesture provided in connection with the mirrored display on the display device of FIG. 3B in accordance with one or more embodiments.
Figure 5B:
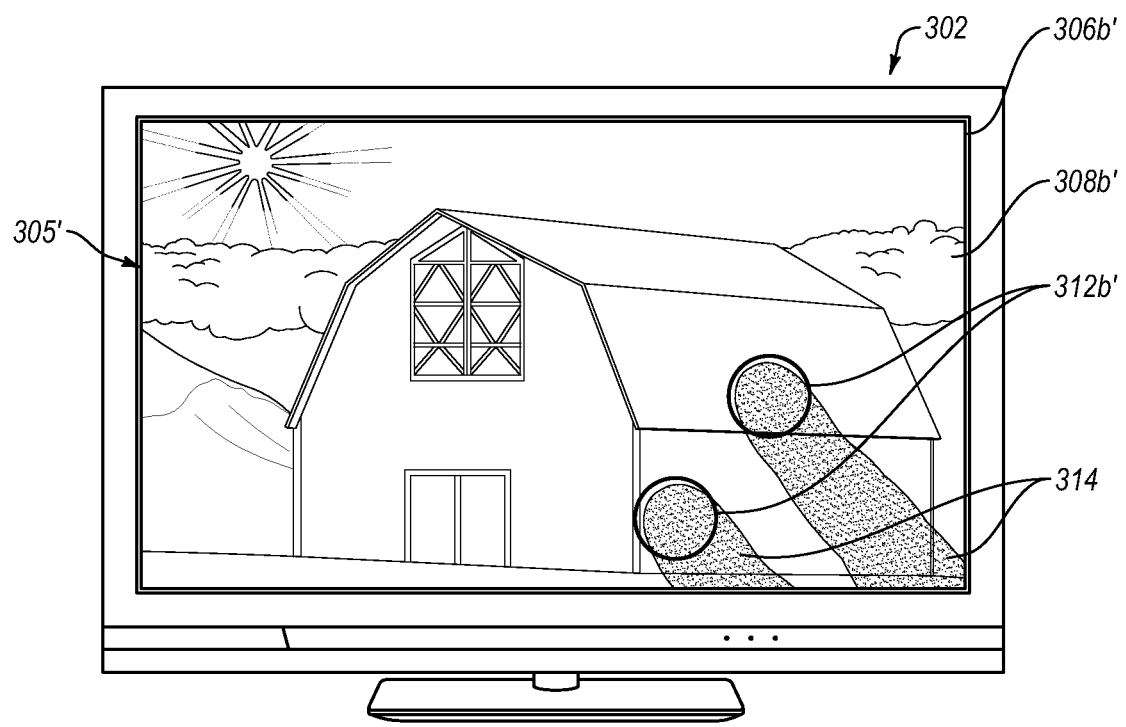

A multi-finger single point touch gesture is demonstrated in FIGS. 5A and 5B. For example, as shown in FIGS. 5A and 5B, the display mirroring system 100 may demonstrate a two-finger tap gesture. In one or more embodiments, the motions of a two-finger tap gesture may include fingers 310a hovering momentarily above a display element 308b, briefly touching the touch screen 304, and lifting off the touch screen 304.

As discussed above with regard to FIGS. 3C and 4A, the touch screen 304 may display a graphical user interface of any one of a variety of programs. For example, in FIG. 5A, the graphical user interface 306b is a graphical user interface of a photograph editing software, and the bulk of the graphical user interface 306b is taken up by a single display element 308b, which, in this case, is a display box. In one or more embodiments, a display box display element includes the contents of a media file. In the embodiment illustrated in FIG. 5A, the display element 308b displays a digital photograph. Particularly, in the embodiment illustrated in FIG. 5A, a two-finger tap gesture may cause a portion of a digital photograph displayed within the display element 308b to become enlarged.

In one or more embodiments, the display mirroring system 100 may detect and utilize touch gestures performed on a touch screen of a client device. For example, in FIG. 5A, the user input detector 104 may detect the two-finger tap gesture indicated by the touch gesture indicator 312b. In one or more embodiments, the user input detector 104 also detects each area of the display element 308a affected by each finger of fingers 310a used in the touch gesture indicated by the touch gesture indicator 312b. For example, in FIG. 5A, a two-finger tap gesture performed in one area of the display element 308b would cause a different area of a digital photograph to become enlarged than a two-finger tap gesture performed in a different area of the display element 308b.

The display mirroring system 100, as described above, may provide a demonstration of a detected touch gesture to a display device. For example, the touch gesture demonstration generator 106 may generate a demonstration of the two-finger tap gesture as shown by FIG. 5A. In one or more embodiments, the display mirroring system 100 may provide a generated demonstration of the two-finger tap gesture indicated by the touch gesture indicator 312b to the display device 302, as shown in FIG. 5B.

As shown by FIG. 5B, a particular embodiment includes the display device 302 displaying the mirrored graphical user interface 306b', which mirrors the graphical user interface 306b of FIG. 5A. As shown, the mirrored graphical user interface 306b' further includes the mirrored display element 308b'. In one or more embodiments, the display mirroring system 100 may superimpose a generated demonstration of a two-finger tap gesture over the mirrored graphical user interface 306b'. For example, the display manager 102 may superimpose a representation of a finger 314 and the touch gesture indicator 312b' over the mirrored graphical user interface 306b' so as to provide a demonstration of the two-finger tap gesture detected with regard to FIG. 5A. In one or more embodiments, as shown in FIG. 5B, the mirrored graphical user interface 306b' may cover the entirety of the mirrored display 305'.

The touch gesture demonstration generator 106 may generate an animated touch gesture demonstration of the two-finger touch gesture. For example, such an animated touch gesture demonstration may include the representation of the finger 314 hovering momentarily above the mirrored display element 308b', briefly contacting the mirrored graphical user interface 306b' at the mirrored display element 308b', and lifting off the mirrored graphical user interface 306b'. In one or more embodiments, the touch gesture demonstration generator 106 may generate the animated touch gesture demonstration according to any of the configurations discussed above.

The display mirroring system 100 can detect the location of the fingers 310a relative to the display 305 and provide the fingers 314 in the same location relative to the mirrored display 305'. Similarly, the display mirroring system 100 can detect the duration of the tap performed by the fingers 310a and cause the animation of the tap gesture performed by the fingers 314 to be of the same duration.

Alternatively, the touch gesture demonstration generator 106 may generate a non-animated touch gesture demonstration of the two-finger touch gesture. For example, the touch gesture demonstration generator 106 may generate a demonstration that merely consists of the representation of the finger 314 in combination with the mirrored touch gesture indicator 312b'. In one or more embodiments, the display manager 102 superimposes the non-animated touch gesture demonstration provided by the touch gesture demonstration generator 106 over the mirrored graphical user interface 306b', as shown in FIG. 5B. The touch gesture demonstration generator 106 may configure a non-animated touch gesture demonstration according to any of the configurations described above.

A multi-finger single point touch gesture is demonstrated in FIGS. 5A and 5B, but the display mirroring system 100 can also provide touch gesture demonstrations for multi-finger multi-point touch gestures. Multi-finger multi-point touch gestures include multiple fingers interacting with multiple points on a graphical user interface. Multi-finger multi-point touch gestures can include a pinch open, a pinch close, a rotate, a two-handed touch gesture, or any other similar touch gesture. For example, a multi-finger multi-point touch gesture is demonstrated in FIGS. 6A and 6B.

Figures 6A, 6B:
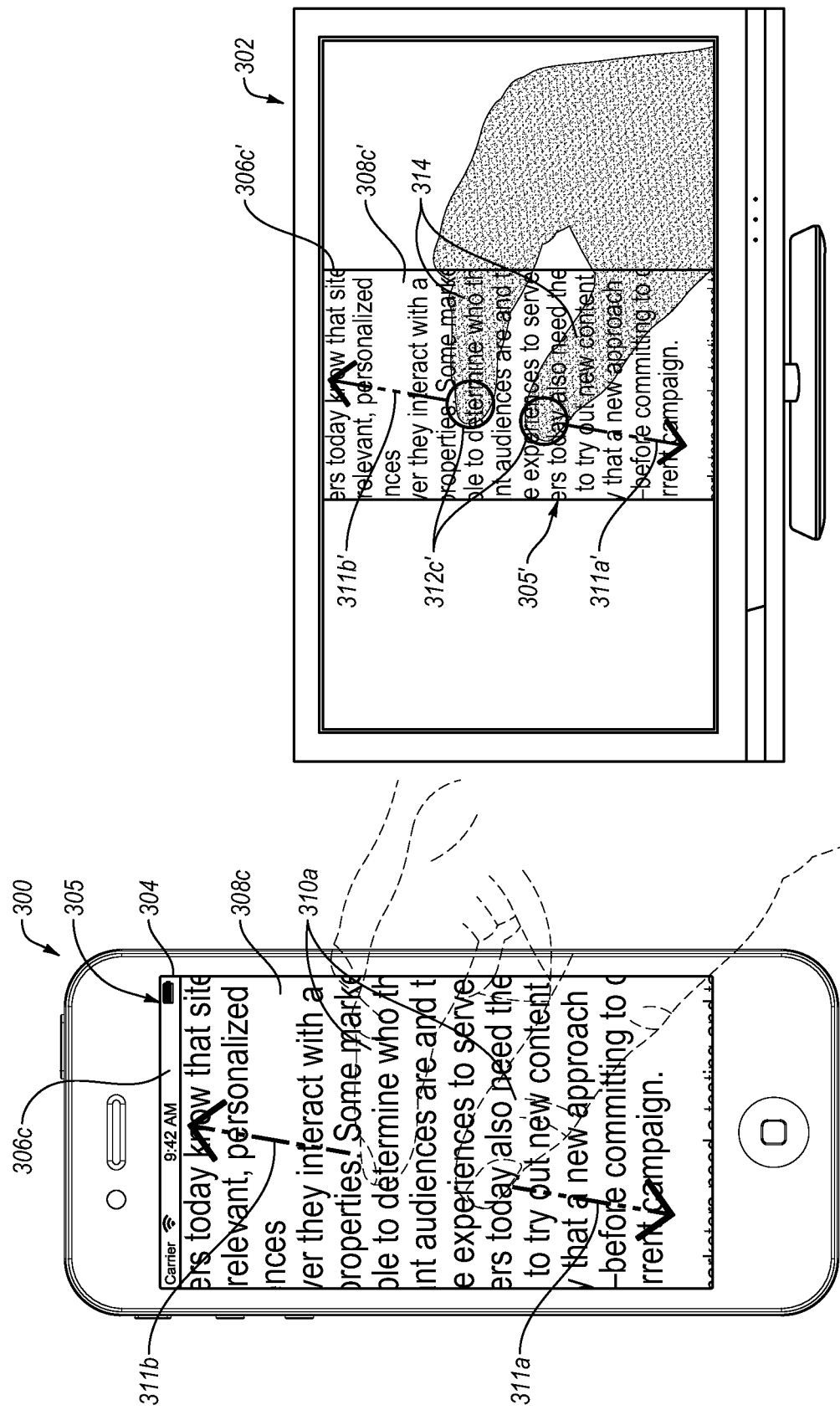
FIGS. 6A-6B illustrate still another touch gesture performed on the touch screen of FIG. 3A and a corresponding demonstration of the touch gesture provided in connection with the mirrored display on the display device of FIG. 3B in accordance with one or more embodiments.

FIGS. 6A and 6B illustrate a pinch-open touch-gesture demonstration used in connection with a graphical user interface of a word processor or a webpage. For example, in the embodiment illustrated in FIG. 6A, the touch screen 304 displays a graphical user interface 306c of a word processor. In a particular embodiment, as the graphical user interface 306c is part of a word processor, most of graphical user interface 306c is taken up by the display element 308c, which, in this case, is a text-editing box. In one or more embodiments, a pinch-open touch gesture, as shown by FIG. 6A involves fingers 310a moving away from each other as indicated by the arrows 311a, 311b. The pinch-open touch gesture can cause a portion of text in a text-editing box to become enlarged.

The display mirroring system 100, as described above, may detect the pinch-open touch gesture and provide a demonstration of the pinch-open touch gesture to a display device 302. For example, in FIG. 6B, the display device 302 displays a mirrored graphical user interface 306c', which mirrors the graphical user interface 306c of FIG. 6A. In one or more embodiments, the mirrored graphical user interface 306c' further includes the mirrored display element 308c'. In a preferred embodiment, the display mirroring system 100 may superimpose a generated demonstration of a pinch-open touch gesture over the mirrored graphical user interface 306c'. The touch gesture demonstration generator 106 may generate the demonstration of the pinch-open touch gesture to be animated or non-animated as described above.

The display mirroring system 100 can detect the location of the fingers 310a relative to the display 305 and provide the fingers 314 in the same location relative to the mirrored display 305'. Similarly, the display mirroring system 100 can detect the movement (i.e., location and length of travel) of the touch gesture performed by the fingers 310a and cause the animation of the tap gesture performed by the fingers 314 to be of the same movement.

In one or more embodiments, the display mirroring system 100 can detect and utilize user inputs that affect an accelerometer and/or gyroscope of the client device 300. For example, in one or more embodiments, the client device 300 may include an accelerometer that senses movement and gravity. Similarly, in one or more embodiments, the client device 300 may include a gyroscope that senses other types of movement such as roll, pitch, and yaw. In a particular embodiment, user inputs that affect an accelerometer and/or gyroscope of the client device can be user inputs such as tilting the client device 300, rotating the client device 300 to change the touch screen 304 orientation (i.e., portrait to landscape), shaking the client device 300, or any other similar type of user input.

For example, in one or more embodiments, the touch gesture demonstration generator 106 may generate demonstrations of user inputs that affect the accelerometer and/or gyroscope of the client device 300, such as those described above. For example, the touch gesture demonstration generator 106 may generate a demonstration of a tilt affecting the client device 300. For instance, in one or more embodiments, the touch gesture demonstration generator 106 may generate a demonstration including the mirrored display 305' shown on the display device 302 in such a way as to indicate a tilt. In one or more alternative embodiments, the touch gesture demonstration generator 106 may generate a demonstration of a tilt that includes the mirrored display 305' skewed on the display device 302 to indicate a tilt. In this way, the touch gesture demonstration generator 106 may generate demonstrations of user inputs that affect an accelerometer and/or gyroscope of the client device 300.

Figure 7A:
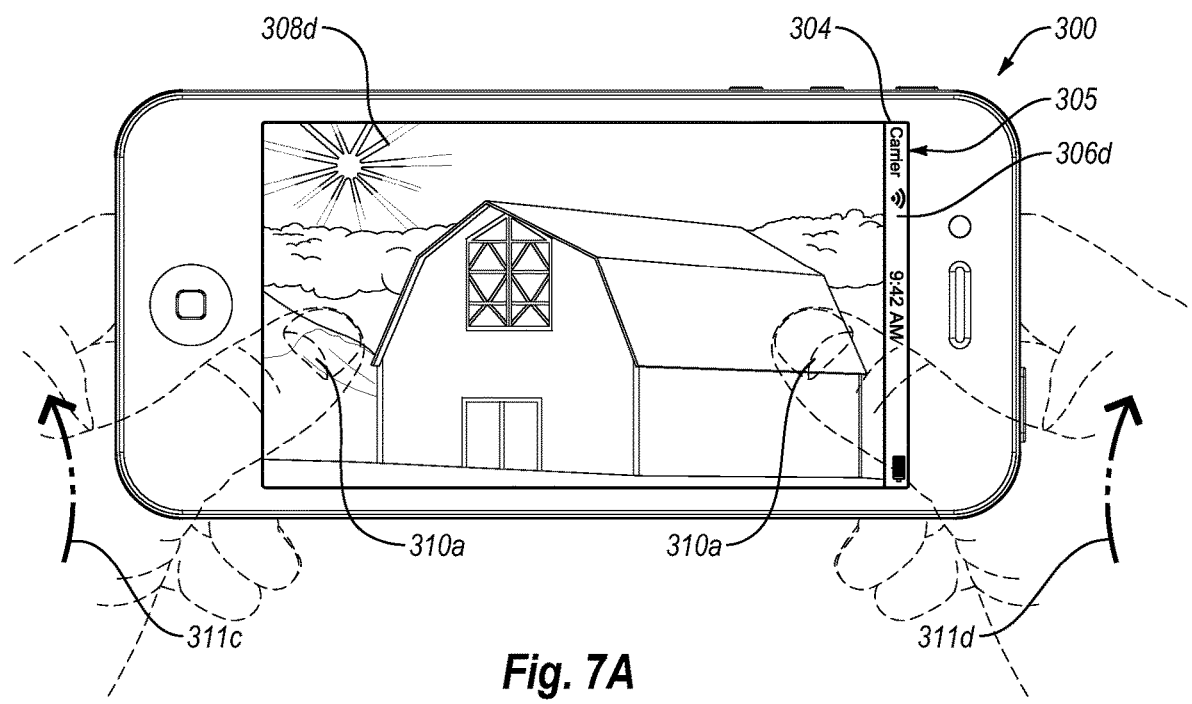
FIGS. 7A-7B illustrate still another gesture performed in connection with the computing device upon which the touch screen of FIG. 3A is provided and a corresponding demonstration of the effect of the gesture provided in connection with the mirrored display on the display device of FIG. 3B in accordance with one or more embodiments.
Figure 7B:
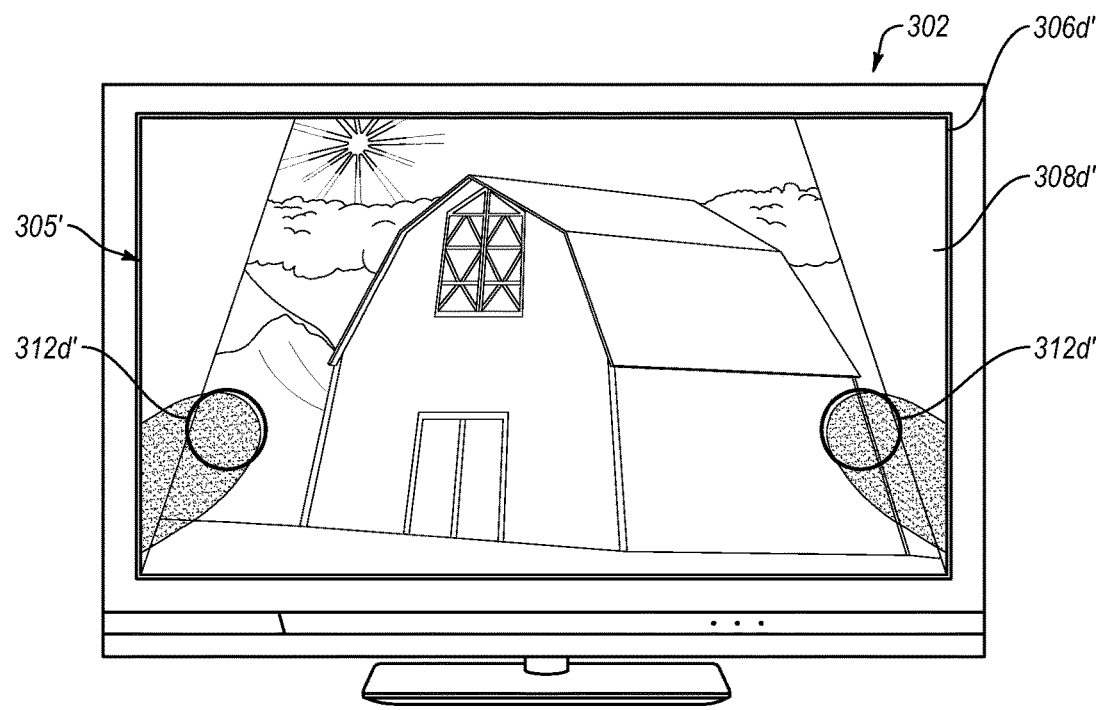

The process for generating a demonstration of a user input that affects the accelerometer and/or gyroscope of the client device 300 is illustrated in FIGS. 7A and 7B. For example, in FIG. 7A, the computing device with the touch screen 304 and the display 305 is held horizontally by fingers 310a such that the graphical user interface 306d is in a "landscape" configuration. As shown in FIG. 7A, the graphical user interface 306d is a graphical user interface of a photograph editing software, and the bulk of the graphical user interface 306d is taken up by a single display element 308d, which, in this case is a display box with a picture of a farmhouse.

As illustrated in FIG. 7A, a user may pivot the computing device 300 backward along arrows 311c and 311d, thus affecting an accelerometer and/or gyroscope of the computing device 300. Accordingly, in one or more embodiments, the display mirroring system 100 may detect and utilize the motion affecting the computing device 300. For example, as shown in FIG. 7B, the display mirroring system 100 may configure the mirrored display 305' of the display device 302 to display the mirrored display element 308d' skewed backward, and with touch gesture indicators 312c' positioned at the bottom corners of the mirrored display element 308d'. Thus, in one or more embodiments, the display mirroring system 100 may skew the mirrored display element 308d' so as to indicate any type of gesture that affects the accelerometer and/or gyroscope of the computing device 300.

Also in one or more embodiments, the display mirroring system 100 can detect and utilize multi-touch user inputs. For example, in one or more embodiments, a multi-touch user input may be a user input that includes a combination of touch gestures. For instance, a multi-touch gesture may be a combination of two tap gestures and a swipe gesture. In an alternative example, a multi-touch gesture may be two perpendicular swipe gestures in an L-shape. Additionally, a multi-touch gesture may include a combination of touch gestures performed by both of a user's hands such as a multi-touch gesture including two swipe gestures performed by both of a user's thumbs on opposites sides of the display 305.

For example, in one or more embodiments, the touch gesture demonstration generator 106 may generate demonstrations of multi-touch gestures, such as those described above. For example, the touch gesture demonstration generator 106 may generate a demonstration of a multi-touch gesture that includes the finger 314 animated and superimposed over the mirrored display 305' so as to indicate the motions of the multi-touch gesture. For instance, in one or more embodiments, the touch gesture demonstration generator 106 may generate a demonstration of an L-shaped touch gesture by animating and superimposing the finger 314 performing a horizontal swipe and a vertical swipe connected at a vertex. In one or more alternative embodiments, the touch gesture demonstration generator 106 may generate a demonstration for any other type of multi-touch gesture.

Figure 8:
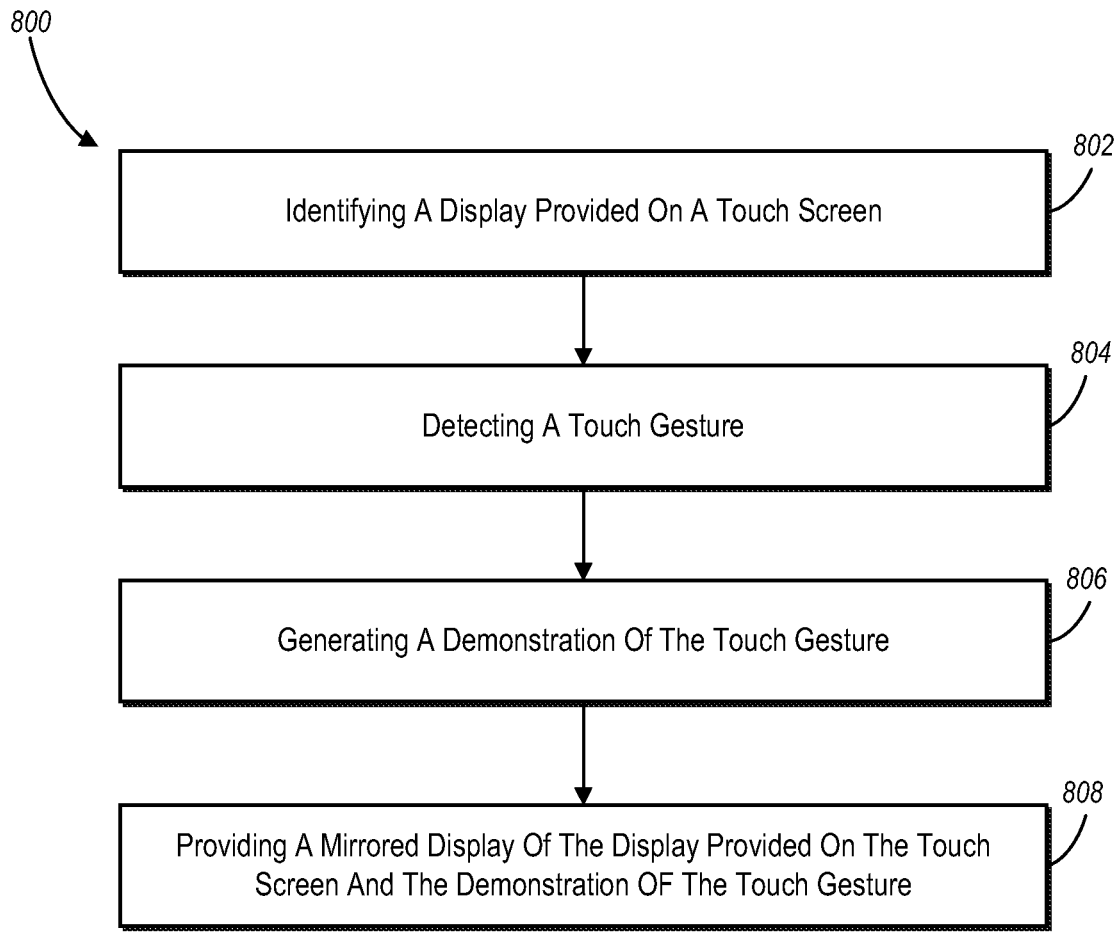
FIG. 8 illustrates a flowchart of a series of acts in a method of emulating touch gestures on a mirrored screen in accordance with one or more embodiments.
Figure 9:
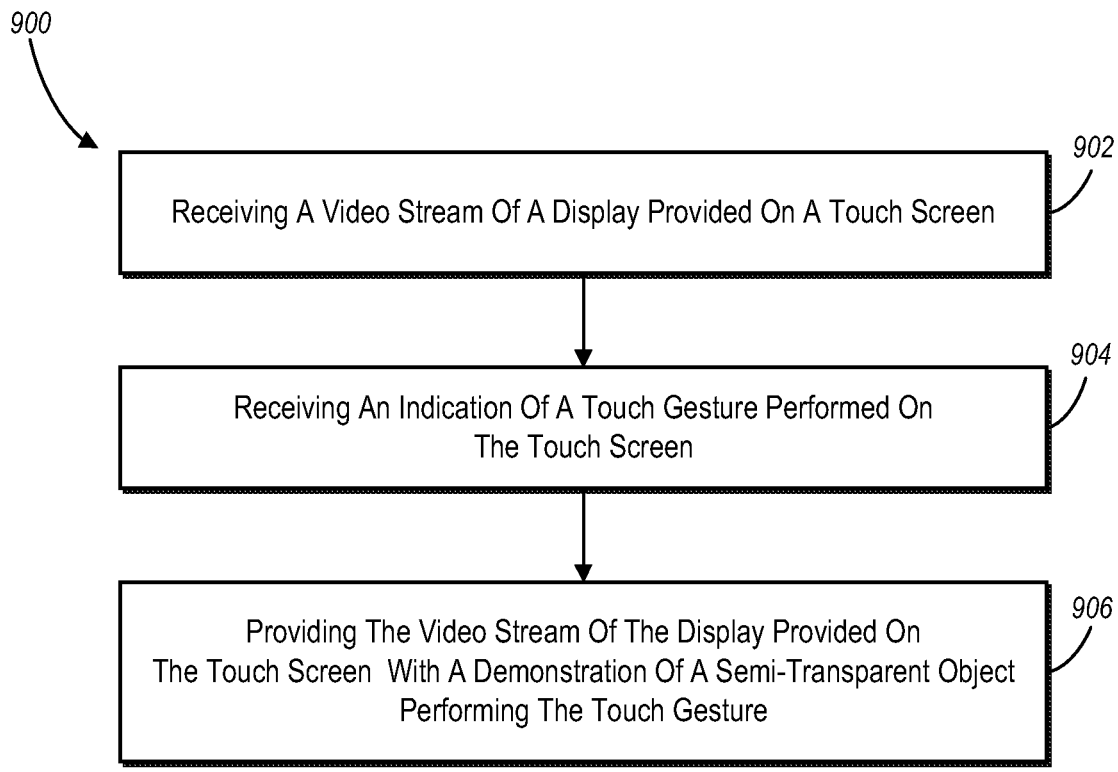
FIG. 9 illustrates a flowchart of a series of acts in a method of emulating touch gestures during a video conferencing session in accordance with one or more embodiments.

FIGS. 1-7B, the corresponding text, and the examples, provide a number of different systems and devices for providing touch gesture demonstrations on a device mirroring a touch screen. In addition to the foregoing, embodiments can also be described in terms of flowcharts comprising acts and steps in a method for accomplishing a particular result. For example, FIGS. 8 and 9 illustrate flowcharts of exemplary methods in accordance with one or more embodiments. The methods described in relation to FIGS. 8 and 9 may be performed with less or more steps/acts or the steps/acts may be performed in differing orders. Additionally, the steps/acts described herein may be repeated or performed in parallel with one another or in parallel with different instances of the same or similar steps/acts.

FIG. 8 illustrates a flowchart of one example method 800 of emulating touch gestures on a mirrored screen. The method 800 includes an act 802 of identifying a display provided on a touch screen. In particular, act 802 can involve identifying a display 305 provided on a touch screen 304 of a client device 300.

Method 800 further includes an act 804 of detecting a touch gesture. In particular, act 804 can involve detecting a touch gesture performed on the touch screen 304. For example, the act 804 of detecting a touch gesture performed on the touch screen 304 can include detecting a touch gesture performed by a single finger 310, multiple fingers 310*a*, a stylus, or other suitable object. In one or more alternative embodiments, the act 804 of detecting a touch gesture can involve detecting a multi-point touch gesture that moves across the touch screen 304 in one or more directions. Additionally, in one or more alternative embodiments, the act 804 of detecting a touch gesture can include detecting a touch gesture starting and ending point, a path of the touch gesture between the starting point and the ending point, a duration of the touch gesture, or a speed of the touch gesture. Act 304 can further involve detecting an object performing the touch gesture. For example, act 304 can involve detecting if a finger, a thumb, multiple digits, a stylus, or another object is performing the touch gesture.

Method 800 further includes an act 806 of generating a demonstration of the touch gesture. In particular, act 806 can involve generating a demonstration of an object performing the touch gesture. Furthermore, the act 806 of generating a demonstration 314 may further include generating an animation of the object interacting with the mirrored display 305' to perform the touch gesture.

Additionally, the act 806 of generating a demonstration 314 may include generating a semi-transparent object so the mirrored display 305' is visible underneath the semi-transparent object. For example, act 806 can further involve generating an animation of one or more semi-transparent fingers interacting with a mirrored display 305' to perform the touch gesture. Also, act 806 of generating the demonstration of the object performing the touch gesture can include retrieving a previously generated animation of the object performing the touch gesture and placing the previously generated animation over a portion of the mirrored display 305' corresponding to a portion of the display 305 provided on the touch screen 304 with which the touch gesture interacted with the touch screen 304.

Method 800 further includes an act 808 of providing a mirrored display of the display provided on the touch screen and the demonstration of the touch gesture. In particular, act 808 can involve providing to a display device a mirrored display 305' of the display 305 provided on the touch screen 304 and the demonstration of the object performing the touch gesture superimposed on the mirrored display 305'.

Method 800 may further include identifying an update to the display provided on the touch screen in response to the detected touch gesture. For example, identifying an update to the display 305 provided on the touch screen may be in response a tap gesture, a double-tap gesture, a swipe gesture, a pinch gesture, or the like. Furthermore, method 800 may include providing the identified update on the mirrored display 305' after the demonstration 314 of the object performing the touch gesture.

Additionally, method 800 may also include detecting a speed of the touch gesture. For example, the method 800 of detecting a speed of the touch gesture may include detecting a fast flick touch gesture, a slow flick touch gesture, a fast scroll gesture, a slow scroll gesture, a fast pinch gesture, or a slow pinch gesture. Method 800 may further include causing the animation of the object to proceed at the detected speed of the touch gesture.

Furthermore, method 800 may also include detecting a display element with which the touch gesture interacts. For example, method 800 may include detecting a tap touch gesture on display 305 that interacts with a display element 308, 308*a*, 308*b*, 308*c*. Method 800 may further include causing the animation of the object to interact with a mirrored display element 308', 308*a*', 308*b*', 308*c*' of the mirrored display 305' that corresponds to the display element 308, 308*a*, 308*b*, 308*c*.

FIG. 9 illustrates a flowchart of method 900 of emulating touch gestures. As shown, method 900 can include an act 902 of receiving a video stream of a display provided on a touch screen. In particular, the act 902 can involve receiving, from a client device 204 at a server 210, a video stream of a display provided on a touch screen 304 of the client device 204.

Method 900 can also include an act 904 of receiving an indication of a touch gesture performed on the touch screen. In particular, the act 904 can involve receiving, from the client device 204 at the server 210, an indication of a touch gesture performed on the touch screen 304 of the client device 204. In one or more embodiments, the act 904 of receiving an indication of a touch gesture performed on the touch screen 304 of the client device 204 can involve receiving an indication of a multi-finger touch gesture was performed on the touch screen 304. In one or more embodiments, the act 904 of receiving an indication of a touch gesture performed on the touch screen 304 may include detecting a swipe gesture.

Method 900 can also include an act 906 of providing the video stream of the display provided on the touch screen with a demonstration of a semi-transparent object performing the touch gesture. In particular, the act 906 can involve providing, from the server 210 to one or more additional devices 206, the video stream of the display 305 provided to the touch screen 304 with a demonstration of a semi-transparent object performing the touch gesture superimposed on the display 305'. In one or more embodiments, the act 906 of providing the video stream of the display 305 with the demonstration of a semi-transparent object 314 performing the touch gesture superimposed on the display 305' can include generating an animation of one or more semi-transparent fingers 314 performing the touch gesture. In one or more embodiments, generating the animation of one or more semi-transparent fingers 314 performing the touch gesture can include generating an animation of two-semi-transparent finger 314 performing a multi-finger touch gesture. In one or more alternative embodiments, the act 906 of providing the video stream of the display 305 with the demonstration of a semi-transparent object 314 performing the touch gesture superimposed on the display 305' can include sending the video stream of the display provided on the touch screen with the demonstration of the semi-transparent object performing the touch gesture superimposed on the display as part of a video conferencing session.

Method 900 may further include a step of determining a display element 308, 308*a*, 308*b*, 308*c*, of the display 305 provided on the touch screen 304 with which the touch gesture interacts. For example, in one or more embodiments, the method 900 may include a step of determining a button, a text box, a scroll bar, a hyperlink, a radio button, or any other display control provided on the touch screen 304 with which the touch gesture interacts. Furthermore, method 900 may also include a step of causing the demonstration 314 of the semi-transparent object performing the touch gesture to interact with a mirrored display element 308', 308*a*', 308*b*', 308*c*' corresponding to the determined display element 308, 308*a*, 308*b*, 308*c*.

Additionally, method 900 may further include a step of determining a starting point (such as that indicated by arrow 311) of a swipe gesture relative to the display 305 provided on the touch screen 304. Method 900 may also include a step of determining a length and a speed of the swipe gesture.

Additionally, method 900 may also include a step of causing the demonstration 314 of the semi-transparent object performing the touch gesture to start at a mirrored point on the display 305' corresponding to the determined starting point and travel the determined length and the determined speed.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general purpose computer to turn the general purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 10:
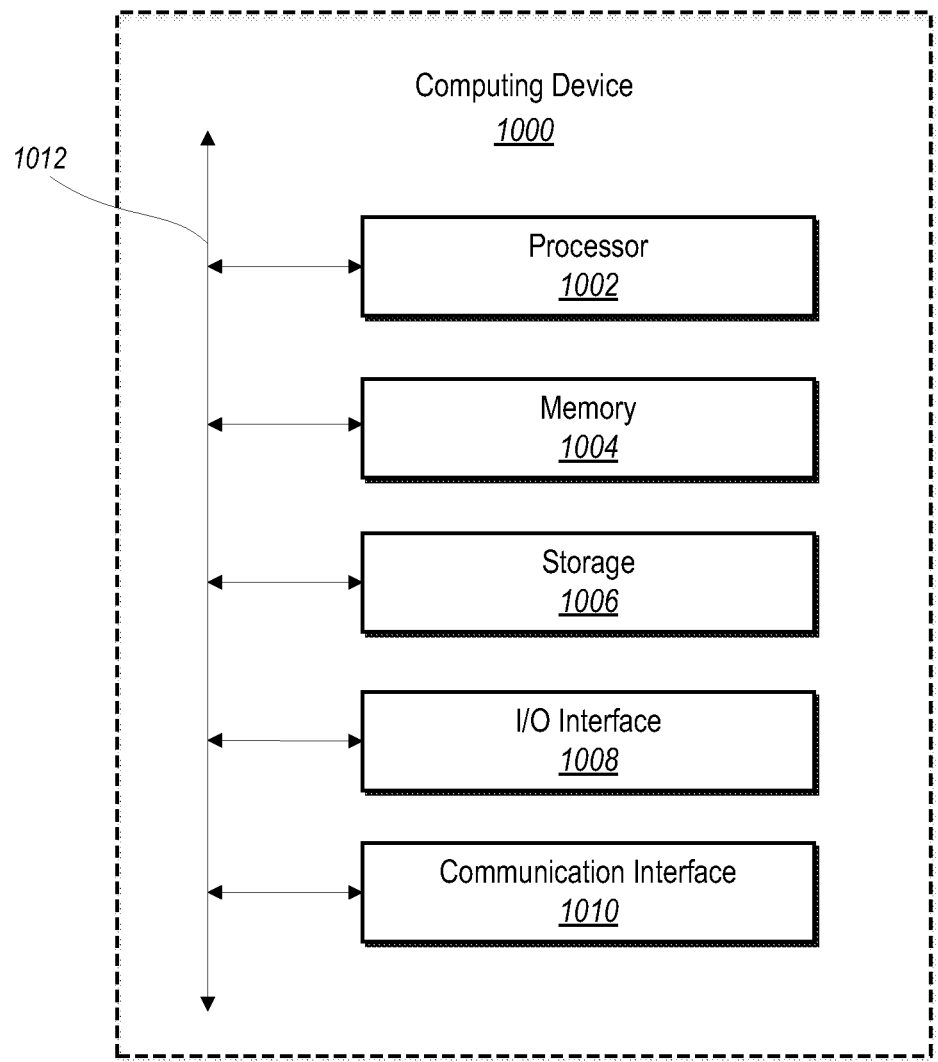
FIG. 10 illustrates a block diagram of an exemplary computing device in accordance with one or more embodiments.

FIG. 10 illustrates a block diagram of an exemplary computing device 1000 that may be configured to perform one or more of the processes described above. One will appreciate that the display mirroring system 100 may be implemented by one or more computing devices such as the computing device 1000. In particular, any of the client device 204, 300, the server 210, and the display device 206, 302 can comprise a computing device 900. As shown by FIG. 10, the computing device 1000 can comprise a processor 1002, memory 1004, a storage device 1006, an I/O interface 1008, and a communication interface 1010, which may be communicatively coupled by way of a communication infrastructure 1012. While an exemplary computing device 1000 is shown in FIG. 10, the components illustrated in FIG. 10 are not intended to be limiting. Additional or alternative components may be used in other embodiments. Furthermore, in certain embodiments, the computing device 1000 can include fewer components than those shown in FIG. 10. Components of the computing device 1000 shown in FIG. 10 will now be described in additional detail.

In particular embodiments, the processor 1002 includes hardware for executing instructions, such as those making up a computer program. As an example and not by way of limitation, to execute instructions, the processor 1002 may retrieve (or fetch) the instructions from an internal register, an internal cache, the memory 1004, or the storage device 1006 and decode and execute them. In particular embodiments, the processor 1002 may include one or more internal caches for data, instructions, or addresses. As an example and not by way of limitation, the processor 1002 may include one or more instruction caches, one or more data caches, and one or more translation lookaside buffers (TLBs). Instructions in the instruction caches may be copies of instructions in the memory 1004 or the storage 1006.

The memory 1004 may be used for storing data, metadata, and programs for execution by the processor(s). The memory 1004 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1004 may be internal or distributed memory.

The storage device 1006 includes storage for storing data or instructions. As an example and not by way of limitation, the storage device 1006 can comprise a non-transitory storage medium described above. The storage device 1006 may include a hard disk drive (HDD), a floppy disk drive, flash memory, an optical disc, a magneto-optical disc, magnetic tape, or a Universal Serial Bus (USB) drive or a combination of two or more of these. The storage device 1006 may include removable or non-removable (or fixed) media, where appropriate. The storage device 1006 may be internal or external to the computing device 1000. In particular embodiments, the storage device 1006 is non-volatile, solid-state memory. In other embodiments, the storage device 1006 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The I/O interface 1008 allows a user to provide input to, receive output from, and otherwise transfer data to and receive data from the computing device 1000. The I/O interface 1008 may include a mouse, a keypad or a keyboard, a touch screen, a camera, an optical scanner, network interface, modem, other known I/O devices or a combination of such I/O interfaces. The I/O interface 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 1008 is configured to provide graphical data to a display for presentation to a user. The graphical data may be representative of one or more graphical user interfaces and/or any other graphical content as may serve a particular implementation.

The communication interface 1010 can include hardware, software, or both. In any event, the communication interface 1010 can provide one or more interfaces for communication (such as, for example, packet-based communication) between the computing device 1000 and one or more other computing devices or networks. As an example and not by way of limitation, the communication interface 1010 may include a network interface controller (NIC) or network adapter for communicating with an Ethernet or other wire-based network or a wireless NIC (WNIC) or wireless adapter for communicating with a wireless network, such as a WI-FI.

Additionally or alternatively, the communication interface 1010 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the communication interface 910 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, the communication interface 1010 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 1012 may include hardware, software, or both that couples components of the computing device 1000 to each other. As an example and not by way of limitation, the communication infrastructure 1012 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A method of emulating touch gestures on a mirrored screen comprising:
    identifying a display of one or more display elements provided on a touch screen of a first device;
    detecting, by at least one processor, a touch gesture interaction performed on the touch screen that interacts with the touch screen relative to the one or more display elements of the display;
    determining a touch screen location of the detected touch gesture interaction relative to the one or more display elements displayed on the touch screen where the touch gesture interaction was detected;
    generating, by the at least one processor, an animated figure of a hand demonstrating a sequence of motions that comprise the touch gesture interaction with the touch screen relative to the one or more display elements, wherein the animated figure of the hand comprises one or more portions that are animated to move independently;
    generating a combined data stream by combining a video stream of the touch screen of the first device and the animated figure of the hand demonstrating the touch gesture interaction by superimposing the animated figure of the hand over the video stream of the touch screen such that the animated figure of the hand appears to interact with one or more mirrored display elements at the location of the detected touch gesture interaction relative to the touch screen;
    providing, to a second device separate from the first device, by the at least one processor, the generated combined data stream such that the second device presents a mirrored display of the touch screen of the first device;
    detecting a tilting of the first device; and
        while the display of the one or more display elements provided on the touch screen of the first device remains unchanged, skewing the mirrored display of the touch screen to indicate the tilting of the first device such that the skewed mirrored display is one of: narrower along a top portion of the skewed mirrored display than along a bottom portion of the skewed mirrored display, or wider along the top portion of the skewed mirrored display than along the bottom portion of the skewed mirrored display.

2. The method as recited in claim 1, wherein generating the animated figure of the hand demonstrating the touch gesture interaction with the touch screen relative to the one or more display elements further comprises generating the animated figure of the hand demonstrating the sequence of motions that comprise the touch gesture interaction in combination with the one or more mirrored display elements corresponding to the one or more display elements with which the detected touch gesture interaction interacted.

3. The method as recited in claim 2, wherein generating the animated figure of the hand demonstrating the sequence of motions that comprise the touch gesture interaction further comprises generating a semi-transparent animated figure of the hand so the one or more mirrored display elements are visible underneath the semi-transparent animated figure of the hand.

4. The method as recited in claim 2, further comprising:
    detecting a speed of the touch gesture interaction; and
    causing the animated figure of the hand to proceed at the detected speed of the touch gesture interaction.

5. The method as recited in claim 3, wherein the animated figure of the hand comprises one or more semi-transparent fingers moving independently and interacting with the one or more mirrored display elements to mimic the detected touch gesture interaction performed on the touch screen that interacted with the touch screen relative to the one or more display elements of the display.

6. The method as recited in claim 5,
    wherein generating the animated figure of the hand demonstrating the sequence of motions that comprise the touch gesture interaction further comprises retrieving a previously generated animated figure of the hand demonstrating the sequence of motions that comprise the touch gesture interaction; and
    wherein generating the combined data stream comprises superimposing the previously generated animated figure of the hand demonstrating the sequence of motions that comprise the touch gesture interaction over the one or more mirrored display elements at the location of the touch gesture interaction relative to the one or more display elements and the touch screen of the first device.

7. The method as recited in claim 1, further comprising:
    receiving one or more demonstration configurations; and
    wherein generating the animated figure of the hand demonstrating the sequence of motions that comprise the touch gesture interaction with the touch screen relative to the one or more display elements is based on the one or more demonstration configurations.

8. The method as recited in claim 1, further comprising:
    receiving a digital photograph of a user's hand; and
    wherein generating the animated figure of the hand comprises generating the animated figure of the hand to appear as the digital photograph of the user's hand demonstrating the sequence of motions that comprise the touch gesture interaction with the touch screen relative to the one or more display elements.

9. The method as recited in claim 1, wherein:
    detecting the touch gesture interaction comprises detecting a pinch-open touch gesture that causes the one or more display elements to become enlarged about a central point of the pinch-open touch gesture;

determining the touch screen location of the detected touch gesture interaction comprises detecting the location of the central point of the pinch-open touch gesture relative to the one or more display elements; and generating the combined data stream comprises combining the video stream of the touch screen of the first device and the animated figure of the hand demonstrating the touch gesture interaction by superimposing the animated figure of the hand over the video stream of the touch screen at the location of the central point of the pinch-open touch gesture such that the enlargement of the one or more mirrored display elements in the video stream of the touch screen coincide with the animated figure of the hand.

10. The method as recited in claim 1, wherein, in response to skewing the mirrored display, the animated figure of the hand demonstrating the touch gesture interaction in the combined data stream remains unchanged.

11. The method as recited in claim 1, further comprising:
detecting another tilting of the first device that return the first device to an original orientation; and
updating the mirrored display of the touch screen such that the top portion of the mirrored display and the bottom portion mirrored display are the same width.

12. A method of emulating touch gestures comprising:
receiving, from a first device at a server, a video stream of a display of one or more display elements provided on a touch screen of the first device;
receiving, from the first device at the server, an indication of a touch gesture interaction performed on the touch screen of the first device interacting with the one or more display elements;
determining a touch screen location of the touch gesture interaction relative to the one or more display elements displayed on the touch screen where the touch gesture interaction was detected;
generating an animated figure of a semi-transparent hand performing a sequence of motions that comprise the touch gesture interaction performed on the touch screen, wherein the animated figure of the semi-transparent hand comprises one or more portions that are animated to move independently;
generating a combined data stream comprising the video stream of the display and the animated figure of the semi-transparent hand demonstrating the touch gesture interaction superimposed over the display at a location on the display that corresponds with the determined touch screen location of the detected touch gesture interaction such that the animated figure of the semi-transparent hand appears to interact with the same one or more display elements in the display that the indicated touch gesture interaction interacted with on the touch screen of the first device;
providing, from the server to one or more additional devices, the generated combined data stream such that the one or more additional devices present a mirrored display of the touch screen of the first device;
detecting a tilting of the first device; and
while the display of the one or more display elements provided on the touch screen of the first device remains unchanged, skewing the mirrored display of the touch screen to indicate the tilting of the first device such that the skewed mirrored display is one of: narrower along a top portion of the skewed mirrored display than along a bottom portion of the skewed mirrored display, or wider along the top portion of the skewed mirrored display than along the bottom portion of the skewed mirrored display.

13. The method as recited in claim 12, wherein the one or more portions of the animated figure of the semi-transparent hand comprise one or more semi-transparent fingers performing the touch gesture interaction.

14. The method as recited in claim 13, wherein receiving, from the first device at the server, the indication of the touch gesture interaction performed on the touch screen of the first device interacting with the one or more display elements comprises receiving an indication of a multi-finger touch gesture interaction performed on the touch screen.

15. The method as recited in claim 14, wherein generating the animated figure of the semi-transparent hand performing the sequence of motions that comprise the touch gesture interaction further comprises generating an animated figure of the semi-transparent hand comprising two semi-transparent fingers performing a sequence of motions that comprise the multi-finger touch gesture interaction relative to the one or more display elements.

16. The method as recited in claim 12, wherein providing the generated combined data stream comprises sending the combined data stream as part of a video conferencing session.

17. The method as recited in claim 12, further comprising:
determining a starting point of the touch gesture interaction relative to the one or more display elements provided on the touch screen;
determining a length and a speed of the touch gesture interaction with the one or more display elements; and
wherein generating the animated figure of the semi-transparent hand performing the sequence of motions that comprise the touch gesture interaction comprises generating the animated figure of the semi-transparent hand to start at a mirrored point on the display within the video stream corresponding to the determined starting point and travel the determined length and the determined speed.

18. A display mirroring system, comprising:
at least one processor;
at least one non-transitory computer readable storage medium storing instructions thereon, that, when executed by the at least one processor, cause the system to:
identify a display of one or more display elements provided on a touch screen of a first device;
detect a touch gesture interaction performed on the touch screen that interacts with the touch screen relative to the one or more display elements of the display determine a touch screen location of the detected touch gesture interaction relative to the one or more display elements displayed on the touch screen where the touch gesture interaction was detected;
generate an animated figure of a hand demonstrating a sequence of motions that comprise the touch gesture interaction performed on the touch screen, wherein the animated figure of the hand comprises one or more portions that are animated to move independently;
generate a combined data stream by combining a video stream of the touch screen of the first device and the animated figure of the hand demonstrating the touch gesture interaction by superimposing the animated figure of the hand over video stream of the touch screen at a location corresponding to the determined touch screen location such that the animated figure of the hand appears to interact with one or more mirrored display elements at the touch screen location of the detected touch gesture interaction relative to the touch screen;

provide, to a second device separate from the first device, the generated combined data stream such that the second device presents a mirrored display of the touch screen of the first device;

detect a tilting of the first device; and while the display of the one or more display elements provided on the touch screen of the first device remains unchanged, skew the mirrored display of the touch screen to indicate the tilting of the first device such that the skewed mirrored display is one of: narrower along a top portion of the skewed mirrored display than along a bottom portion of the skewed mirrored display, or wider along the top portion of the skewed mirrored display than along the bottom portion of the skewed mirrored display.

19. The system as recited in claim 18, wherein generating the animated figure of the hand demonstrating the sequence of motions that comprise the touch gesture interaction further comprises retrieving a previously generated animated figure of the hand demonstrating the sequence of motions that comprise the touch gesture interaction.

20. The system as recited in claim 19, further comprising computer-executable instructions that, when executed cause the system to generate the animated figure of the hand performing the sequence of motions that comprise the touch gesture by animating one or more semi-transparent fingers of the animated figure of the hand interacting with the skewed mirrored display to perform the touch gesture.

* * * * *